United States Patent
Roth et al.

(10) Patent No.: US 9,946,869 B1
(45) Date of Patent: Apr. 17, 2018

(54) POSTURE ASSESSMENT IN A SECURE EXECUTION ENVIRONMENT

(71) Applicant: Amazon Technologies, Inc., Reno, NV (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 14/476,593

(22) Filed: Sep. 3, 2014

(51) Int. Cl.
*G06F 21/00* (2013.01)
*G06F 21/50* (2013.01)
*H04L 29/08* (2006.01)
*H04L 29/06* (2006.01)
*G06F 9/455* (2018.01)

(52) U.S. Cl.
CPC .......... *G06F 21/50* (2013.01); *G06F 9/45558* (2013.01); *H04L 63/10* (2013.01); *H04L 67/10* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 5,643,085 A | 7/1997 | Aityan et al. | |
| 5,643,086 A | 7/1997 | Alcorn et al. | |
| 5,666,533 A | 9/1997 | Horiguchi et al. | |
| 5,848,159 A | 12/1998 | Collins | |
| 5,867,578 A | 2/1999 | Brickell et al. | |
| 5,905,799 A | 5/1999 | Ganesan | |
| 6,071,190 A | 6/2000 | Weiss et al. | |
| 6,237,097 B1 | 5/2001 | Frankel et al. | |
| 6,364,796 B1 | 4/2002 | Nakamura et al. | |
| 6,631,354 B1 | 10/2003 | Leymann et al. | |
| 6,694,434 B1 | 2/2004 | McGee et al. | |
| 6,722,986 B1 | 4/2004 | Lyons et al. | |
| 6,834,272 B1 | 12/2004 | Naor et al. | |

(Continued)

FOREIGN PATENT DOCUMENTS

WO   WO2008118648   10/2008

OTHER PUBLICATIONS

McKeen, Frank et al., "Innovative Instructions and Software Model for Isolated Execution", pp. 1-8, Intel Corporation, 2013.

(Continued)

*Primary Examiner* — Amir Mehrmanesh
(74) *Attorney, Agent, or Firm* — Davis Wright Tremaine LLP

(57) ABSTRACT

Systems and methods for providing computer system monitoring as a service of a computing resource service provider, monitoring capacity computer system of a customer of the computing resource service provider, and based on the request, launching a monitoring agent in a protected execution environment in which the monitoring agent is configured to generate an assessment of the computer system and provide the assessment of the computer system.

26 Claims, 12 Drawing Sheets

(56) References Cited

U.S. PATENT DOCUMENTS

| | | |
|---|---|---|
| 7,063,615 B2 | 6/2006 | Alcorn et al. |
| 7,917,747 B2 | 3/2011 | Wolf |
| 8,014,308 B2 | 9/2011 | Gates, III et al. |
| 8,291,468 B1 | 10/2012 | Chickering |
| 8,352,741 B2 | 1/2013 | Simon et al. |
| 8,407,584 B1 | 3/2013 | Broodman et al. |
| 8,473,754 B2 | 6/2013 | Jones et al. |
| 8,478,977 B1 | 7/2013 | Smith et al. |
| 8,566,216 B1 | 10/2013 | Topitzer et al. |
| 8,694,795 B1 | 4/2014 | Aissi |
| 9,116,733 B2 | 8/2015 | Banga et al. |
| 9,154,479 B1 | 10/2015 | Sethi |
| 9,177,353 B2 | 11/2015 | Chhabra et al. |
| 9,246,690 B1 | 1/2016 | Roth et al. |
| 9,323,686 B2 | 4/2016 | Mckeen et al. |
| 9,389,933 B2 | 7/2016 | Baumann et al. |
| 9,491,111 B1 | 11/2016 | Roth et al. |
| 2002/0184046 A1 | 12/2002 | Kamada et al. |
| 2003/0233544 A1 | 12/2003 | Erlingsson |
| 2004/0176068 A1 | 9/2004 | Paatero |
| 2005/0091535 A1 | 4/2005 | Kavalam et al. |
| 2005/0278418 A1 | 12/2005 | Rathakrishnan et al. |
| 2006/0161887 A1 | 7/2006 | Krishnaswamy et al. |
| 2007/0005992 A1 | 1/2007 | Schluessler et al. |
| 2007/0050763 A1 | 3/2007 | Kagan et al. |
| 2007/0153715 A1 | 7/2007 | Covington et al. |
| 2007/0174906 A1 | 7/2007 | Burchett et al. |
| 2007/0206799 A1 | 9/2007 | Wingert et al. |
| 2008/0080396 A1 | 4/2008 | Meijer et al. |
| 2008/0216071 A1 | 9/2008 | Gidalov |
| 2009/0112359 A1 | 4/2009 | Sanguinetti |
| 2009/0204964 A1 | 8/2009 | Foley et al. |
| 2009/0313406 A1 | 12/2009 | Suh et al. |
| 2010/0031325 A1 | 2/2010 | Maigne et al. |
| 2010/0077473 A1 | 3/2010 | Ohta et al. |
| 2010/0306379 A1 | 12/2010 | Ferris |
| 2011/0179468 A1* | 7/2011 | Adams .................... G06F 21/33 726/4 |
| 2012/0084838 A1 | 4/2012 | Inforzato et al. |
| 2012/0144457 A1 | 6/2012 | Counterman |
| 2012/0159184 A1 | 6/2012 | Johnson et al. |
| 2012/0192177 A1 | 7/2012 | Tsirkin |
| 2013/0007239 A1 | 1/2013 | Agarwal et al. |
| 2013/0024371 A1 | 1/2013 | Hariramani et al. |
| 2013/0117561 A1 | 5/2013 | Chawla et al. |
| 2013/0151846 A1 | 6/2013 | Baumann et al. |
| 2013/0174150 A1 | 7/2013 | Nakajima |
| 2013/0174151 A1 | 7/2013 | Nakajima |
| 2013/0179682 A1 | 7/2013 | Ramachandran et al. |
| 2013/0198853 A1 | 8/2013 | McKeen et al. |
| 2013/0227286 A1 | 8/2013 | Brisson |
| 2013/0246778 A1 | 9/2013 | Nikara et al. |
| 2013/0282776 A1 | 10/2013 | Durrant et al. |
| 2013/0312117 A1 | 11/2013 | Sapp, II et al. |
| 2013/0318343 A1 | 11/2013 | Bjarnason et al. |
| 2013/0318577 A1 | 11/2013 | Bulusu et al. |
| 2013/0326504 A1 | 12/2013 | Tsirkin et al. |
| 2014/0051432 A1* | 2/2014 | Gupta .................... G06F 21/57 455/425 |
| 2014/0075496 A1 | 3/2014 | Prakash et al. |
| 2014/0105393 A1 | 4/2014 | Kolesnikov |
| 2014/0108792 A1 | 4/2014 | Borzycki et al. |
| 2014/0181359 A1 | 6/2014 | Zhang et al. |
| 2014/0201841 A1 | 7/2014 | Deshpande et al. |
| 2014/0205099 A1* | 7/2014 | Christodorescu ..... H04L 9/0819 380/278 |
| 2014/0223543 A1 | 8/2014 | Jeansonne et al. |
| 2014/0282935 A1 | 9/2014 | Lal et al. |
| 2014/0283098 A1 | 9/2014 | Phegade et al. |
| 2014/0317686 A1 | 10/2014 | Vetillard |
| 2014/0325515 A1 | 10/2014 | Salmela et al. |
| 2014/0331317 A1 | 11/2014 | Singh |
| 2014/0351583 A1 | 11/2014 | Bettale et al. |
| 2014/0373012 A1 | 12/2014 | Ylitalo et al. |
| 2015/0007175 A1 | 1/2015 | Potlapally et al. |
| 2015/0058629 A1 | 2/2015 | Yarvis et al. |
| 2015/0127834 A1 | 5/2015 | Udupi et al. |
| 2015/0143347 A1 | 5/2015 | Jones et al. |
| 2015/0143374 A1 | 5/2015 | Banga et al. |
| 2015/0143375 A1 | 5/2015 | Bruso et al. |
| 2015/0199509 A1 | 7/2015 | Wille |
| 2015/0200948 A1 | 7/2015 | Cairns et al. |
| 2015/0244716 A1 | 8/2015 | Potlapally et al. |
| 2015/0254451 A1 | 9/2015 | Doane et al. |
| 2015/0278528 A1 | 10/2015 | Xing et al. |
| 2015/0347768 A1 | 12/2015 | Martin et al. |
| 2015/0356462 A1* | 12/2015 | Fawaz .................. G06N 99/005 706/12 |
| 2015/0379306 A1 | 12/2015 | Zimmer et al. |
| 2016/0036826 A1 | 2/2016 | Pogorelik et al. |
| 2016/0065376 A1 | 3/2016 | Smith et al. |
| 2016/0088009 A1 | 3/2016 | Gupta et al. |
| 2016/0203313 A1 | 7/2016 | El-Moussa et al. |

OTHER PUBLICATIONS

Intel SGX for Dummies—Part 1 (Intel SGX Design Objectives), pp. 1-4, Sep. 26, 2013, Intel Corporation.

Intel SGX for Dummies—Part 2, pp. 1-3, Jun. 2, 2014, Intel Corporation.

Intel SGX for Dummies—Part 3, pp. 1-3, Sep. 1, 2014, Intel Corporation.

Software Guard Extensions Programming Reference, 2010-2013, Intel Corporation.

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

Berger et al., "TVDc: Managing Security in the Trusted Virtual Datacenter," ACM, 2008, 8 pages.

\* cited by examiner

US 9,946,869 B1

POSTURE ASSESSMENT IN A SECURE EXECUTION ENVIRONMENT

BACKGROUND

Modern computer systems place a high importance on maintaining data and application security. In a modern distributed and/or virtual computer system environment where users, services, applications, virtual machines, controlling domains and hosts have access to a computer system, maintaining data and application security may be a difficult problem. In a distributed and/or virtual computer system environment, for example, where the computer system resources may be provided by a computing resource service provider, customers or the computing resource service provider may also wish for additional assurances that users, services, applications, and virtual machines are fully compliant with security software and that confidential data and/or privileged applications are properly safeguarded.

BRIEF DESCRIPTION OF THE DRAWINGS

Various embodiments in accordance with the present disclosure will be described with reference to the drawings, in which.

DETAILED DESCRIPTION

Figure 1:
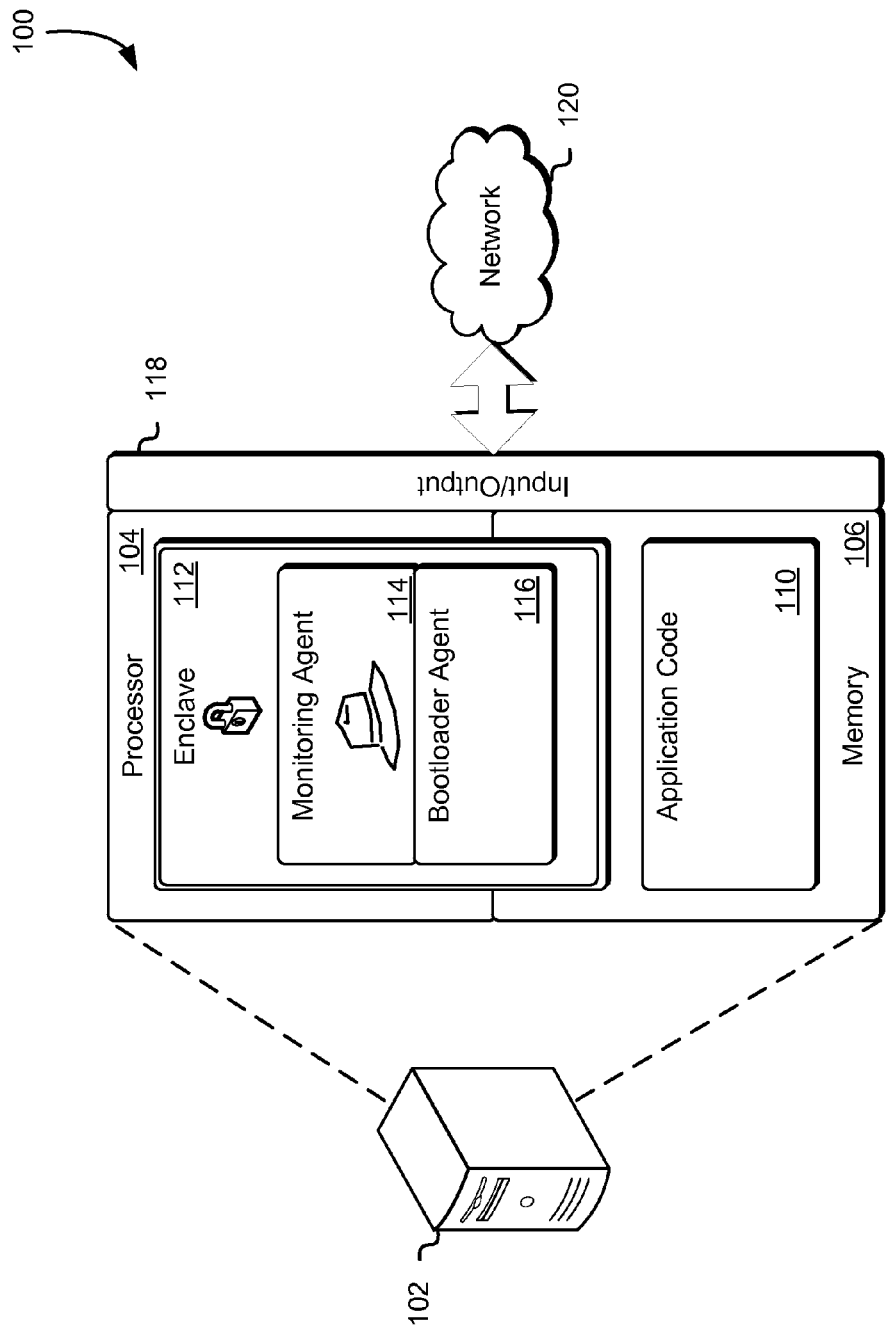
FIG. 1 illustrates an example of a computer system in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems and methods for running trusted code in the form of a monitoring agent operable to inspect a running computer system and provide measurements of the computer system. The monitoring agent may be installed and launched in an enclave of a customer instance to perform posture assessments, monitor compliance, and gather information of an instance of a customer of a computing resource service provider. Likewise, the monitoring agent may provide a window into the customer enclave by performing posture assessments, monitoring compliance, and gathering information about customer code running within the enclave, and reporting results of its monitoring to the computing resource service provider.

Examples of monitoring agents as used include anti-virus or anti-malware applications, data loss prevention software, software firewalls, software provided by a customer or computing resource service provider for monitoring corporate policy compliance or compliance with service-level agreements, host intrusion detection applications, vulnerability assessment software, software to provide for the monitoring and/or assessment of such (e.g., software to verify that anti-virus applications are running and up-to-date), and/or other network access controls. The monitoring agent may further comprise a bootloader agent (i.e., executable code for installing and launching other executable code, such as monitoring code), in the enclave. In another aspect of the present disclosure, the monitoring agent may further include executable code running in an enclave that collects information about input/output patterns, performance feedback and resource usage statistics.

The monitoring agent may be provided as a service of a computing resource service provider, or may be provided as a condition on the use of other services of the computing resource service provider. The monitoring agent may be configured to monitor a virtual machine or physical machine or other software or hardware associated with a computer system (i.e., compute capacity). Based on monitoring performed by the monitoring agent, a computing resource service provider, or a third-party may place constraints on the continued use of the monitored compute capacity. For example, if the monitoring agent is an anti-virus program, the computing resource service provider may place restrictions on the ability of the compute capacity to communicate on the network of the computing resource service provider. In another example, if the monitoring agent is code provided by a third-party for monitoring the license of software of the third-party executing in the compute capacity, if the monitoring agent determines that there has been a breach of the license agreement associated with the third-party software, the monitoring agent may cause the third-party software to cease operating in the compute capacity.

Among other reasons, the monitoring agent may provide assurances to the customer that the customer's instance is secure, free from viruses and other malicious software, and that data loss prevention measures are active and effective. Thus, the monitoring agent may ensure that the customer's instance or computer system is compliant with conditions set by a computing resource service provider or by a third-party software provider. For example, it may be that a computing resource service provider allows a customer to instantiate an virtual machine instance within a virtual computer system service of the computing resource service provider on the condition that the customer allow the monitoring agent to monitor the virtual machine instance. In some cases, the customer may be allowed to instantiate the virtual machine instance, but, as a condition to continue running the virtual machine instance or as a condition to allow the customer to connect the virtual machine instance to the network, the customer may consent to allow the monitoring agent to monitor the virtual machine instance.

Alternatively, in some cases, the customer may be allowed to run the instance for some period, such as allowing the customer to execute instructions within the virtual machine instance for 100,000 processor cycles or for some defined amount of time, and then as a condition of continuing to run the virtual machine instance, the customer consents to allow the monitoring agent to monitor the virtual machine instance. Other examples actions that may be taken by the computing resource service provider based on information provided by the monitoring agent include starting, stopping or deprovisioning a customer instance, blocking or restricting the ability of the customer instance to communicate through the computing resource service provider network, changing permissions associated with the customer, users, applications, services of the customer instance and/or allowing or denying the customer instance access to resources or devices of the computing resource service provider.

FIG. 1 illustrates an aspect of an environment 100 in which various embodiments of the present disclosure may be practiced. As illustrated in FIG. 1, the environment 100 may include a computer system 102 having processors 104, memory 106 for execution and storage of applications and data 110 of a customer of a computing resource service provider. The processor 104 may support enclave functionality, such support for as Intel® Software Guard eXtensions (SGX), a module such as a trusted platform module (TPM), system microcode or combinations of these and/or other supported capabilities, for instantiating an enclave 112.

An enclave is a protected area in memory address space of a computer system that provides confidentiality and integrity for applications and data within the protected area. The enclave operates as a secure execution environment; that is, the enclave prevents applications external to the enclave, even privileged applications such as virtualization monitors, basic input/output systems, operating systems, and even other enclaves, from accessing the enclave memory address space, but applications executing within the enclave may access executable instructions and data internal to the enclave. The enclave prevents access to unencrypted enclave data (i.e., data resident within the enclave) by applications external to the enclave, and when the data is written to the memory address space, the data is automatically encrypted. Additionally, information exiting the enclave may be cleansed of data referring to the enclave's protected memory addresses to prevent external software from determining the location of enclave-protected data in memory.

Enclave functionality may be provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. Enclave functionality allows programmatic instantiation of an enclave, which may comprise initializing of an enclave control structure, allocating enclave memory, loading of enclave contents (e.g., applications and/or data loaded into the enclave) into the enclave memory, measuring of the enclave contents, and establishing an enclave identity. Enclave functionality may also include the ability to protect applications and/or data within the enclave from malicious software attacks, by detecting of integrity violations of protected applications and/or data and preventing access to protected applications and/or data that fail integrity checks.

A characteristic of an enclave is an ability to provide remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data.

The enclave 112 of the present disclosure may further have a monitoring agent 114 in the form of executable code for monitoring activity of applications within the enclave 112, and, in some embodiments, may have a bootloader agent 116 for installing and launching the monitoring agent 114. The monitoring agent 114 may be configured to perform such monitoring as monitoring to determine whether anti-virus applications are running and up-to-date, monitoring whether data loss prevention safeguards are effective, and whether corporate policies are being complied with. The computer system may further comprise an input/output module 118 for communicating with entities outside the host computer system through a virtual or physical network 120.

An advantage presented by executing the monitoring agent 114 within an enclave is that an entity that communicates with the monitoring agent 114, such as a computing resource service provider, may be provided assurances that the monitoring agent 114 and its reports have not been tampered with or forged. Likewise, in some cases where other code may be within the enclave, such as customer-provided code, the monitoring agent 114 may be able to monitor such customer-provided code from within the enclave. Although the monitoring agent 114 need not be launched within an enclave on a computer system hosting a customer instance (e.g., virtual computer system) to be monitored rather than from a remote host computer system, one advantage of executing the monitoring agent 114 within the enclave of the computer system hosting a customer instance is that the customer instance may be monitored without performance of the computer system being negatively impacted by network latency.

The computer system 102 any device or equipment configured to execute instructions for performing data computation, manipulation or storage tasks, such as a computer or server. Examples of such computers and servers include data servers and other servers including web server 1206 and application server 1208 described in FIG. 12. The processor 104 may include any suitable processing device capable of supporting enclaves, including processing devices based on Intel® Software Guard eXtensions. The memory 106 may include a number of types of memory, such as described below.

The application 110 may comprise any application code that may be executed on a computer system, including an operating system, system and hardware drivers, business applications, entertainment applications, web browsers, e-mail clients, and anti-virus and other anti-malware applications. In some cases, applications 110 may execute within an enclave 112. In some of those cases, the applications may execute in their own enclave, where as in other applications, the applications may 110 execute in the same enclave as the enclave 112 in which the monitoring agent 114 is running.

In some embodiments, such as that depicted in FIG. 1, the monitoring agent 114 may be instantiated within the enclave 112 on the computer system. As noted, the enclave 112 may be a secure execution environment provided by supporting hardware or software on the computer system such as by a specialized instruction set, such as Intel® Software Guard eXtensions (SGX), a module such as a trusted platform module (TPM), system microcode, a hypervisor configured to manage a virtual of secure execution environments or combinations of these and/or other supported capabilities. One characteristic of a secure execution environment are its ability to provide remote attestation as to the state of the secure execution environment. For example, the secure execution environment may have a set of functions that, when executed by a processor, may provide a measurement indicating the current state of executable code and/or data within the enclave. Another characteristic of a secure execution environment is that it has a root of trust separate and protected from outside entities. That is an entity (e.g., an application running on a device operated by a user), may be configured to trust the secure execution environment because the secure execution environment may have cryptographic keys, such as a private key of a public-private key pair, not visible to outside entities, and outside entities can verify (i.e., trust) information coming from the secure execution environment because the information may be verified as digitally signed with the private key of the enclave. In this manner, a secure execution environment (e.g., an enclave) may be configured such that applications and data within the secure execution environment are protected from entities outside the secure execution environment.

The enclave 112 may be provided by selecting computer systems being configured to support the instantiation of enclaves and causing the enclave 112 to be instantiated. The computer systems may support the instantiation of enclaves based on the hardware capabilities of the system. For example, enclave functionality may be provided to a system by a specialized instruction set, such as Intel® Software Guard eXtensions, a module such as a trusted platform module, system microcode or combinations of these and/or other supported capabilities. As an example, the enclave 112 may be provided by selecting a computer system, such as from a web-based management console, from computer systems configured to support enclave functionality.

Enclave functionality may include functionality for creating, deprovisioning, measuring (i.e., gathering metrics from), and populating enclaves. Enclave functionality may further include generating keys and/or sending and receiving data. Access to such enclave functionality may be provided by a code library, an interface, web service, application programming interface (API), or other access methodology. In response to receiving a request through one of the methods of accessing enclave functionality, the computing resource service provider may provide that access to a user of a computer system. Note that the providers of enclave functionality, the types of enclave functionality, and the methods of providing access to enclave functionality described are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, instructions executed within the enclave 112 by a processor may generate a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and instructions executed within the enclave 112 by a processor may provide the public key of the key-pair to a trusted entity and retain the private key of the key-pair securely within the enclave 112 where it may not be accessible to outside entities. Subsequently, the trusted entity may encrypt data and/or instructions using the public key and provide the encrypted data and/or instructions to the enclave 112, whereupon instructions executed within the enclave 112 by a processor may decrypt the data and/or instructions using the private key held within the enclave 112. Alternately or additionally, instructions executed within the enclave 112 by a processor may digitally sign results of processing or execution using the private key within the enclave 112 to provide assurance to the trusted entity the output has not been tampered with or forged.

In other embodiments usable in combination with other embodiments, the trusted entity may generate a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and the trusted entity may provide the public key of the key-pair to the enclave 112 and retain the private key of the key pair. Subsequently, instructions executed within the enclave 112 by a processor may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave 112 using the private key of the trusted entity to provide assurance to the enclave 112 that the data and/or instructions have not been tampered with or forged. Alternately or additionally, in a technique referred to as enveloping, instructions executed within the enclave 112 by a processor may provide the trusted entity with a session key encrypted using the public key of the trusted entity. Subsequently, instructions executed within the enclave 112 by a processor may provide encrypted data and/or results of processing of execution, whereupon the trusted entity may decrypt the encrypted data and/or results using the session key.

A computer system for hosting enclaves may be a distributed system with multiple hosts, may be a single system with virtual machine instances or may be a networked combination of such systems. A computer system may provide access to such as users, customers, modules, applications, services, processes, programs, operating systems, and controlling domains. Some of the access provided by the computer system to these entities may include providing access to confidential data and/or privileged applications. A computer system may also provide data storage regions to the customer, including memory, disk storage, virtual memory and virtual disk storage. Consequentially, some of the data storage regions provided by the computer system may be configured to store confidential and/or otherwise significant data.

A computer system for hosting enclaves may also run entities (e.g., applications, processes, services, modules, etc.) configured to access and/or manipulate such confidential data. A computer system may also run applications from a computing resource service provider that may utilize privileged code or perform operations on confidential data. Additionally, a computer system may include operating systems, privileged users, and controlling domains having full access to the computer system resources, such as direct access to the computer memory 106, processors, data storage, and the network 120. A customer may wish to secure confidential data, and any applications 110 configured to access such confidential data, by preventing access to the data and/or applications 110 by entities without proper credentials, even those entities that are typically trusted entities such as operating systems, privileged users, and controlling domains. Similarly, a computing resource service provider may also wish to secure such confidential data and any applications 110 configured to access the confidential data by preventing access to the confidential data and applications 110 by any entity without proper credentials.

A computer system of a computing resource service provider may be configured to support a virtualization layer to provide computational resources upon which virtual machines may operate. The virtualization layer may manage memory 106 and processor scheduling for all virtual machines operating on the computer system. The virtualization layer may also launch and/or manage a control domain, also known as a privileged domain, which is a virtual machine having direct access to the hardware of the computer system. The virtualization layer may be any device, software or firmware, used for providing a virtual computing platform for the virtual machines. The virtual machines of the virtualization layer may be provided to customers of the computing resource service provider, and the customers may run an operating system and/or applications on the virtual machines of the customer. An example of a virtualization layer includes a hypervisor.

An entity, such as a service or operating system running on the computer system, the controlling domain, a guest domain running a virtual machine instance, or a service or operating system of the controlling domain or a guest domain, may provide an interface to enclave functionality. An entity (e.g., a user operating a device running applications) with access to a virtual machine instance on the computer system may use that interface to the enclave functionality to, for example, create an enclave, populate the enclave, and/or obtain keys.

In an illustrative example, a computer system may provide enclave functionality, as noted, via the SGX instruction set that may be enabled on the CPU of the computer system, although the scope of the present disclosure extends to other enclaves. The physical hardware of the computer system may be any device or equipment configured to execute instructions for performing data computation, manipulation or storage tasks, such as a computer or server. The computer system may be equipped with processors 104, including a CPU, a graphics processing unit (GPU), and a digital signal processor (DSP). The computer system may further include memory 106, including static and dynamic volatile memory, and non-volatile persistent storage such as optical and magnetic storage disks, tape, and flash memory. The computer system may also include additional hardware such as buses, input/output modules 118, and networking equipment compliant with any handshaking, communications or data transfer protocol.

As noted, a host computer system may provide enclave functionality through instructions made to the processors 104 configured to support a secure execution environment, such as SGX, TPM or a hypervisor configured to support management of secure execution environments. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services, such as block-level data storage services, cryptography services, on-demand data storage services, archival storage services, notification services, authentication services, policy management services, billing services and task services, may also access the enclave functionality to provide that functionality to resources associated with those services. Enclave functionality may also be provided to customers of the computing resource service provider. For example, an entity with access to a service and/or access to the resources served by that service may use enclave functionality to further secure data and/or applications 110 associated with that service. In an illustrative example, a virtual computer system service and/or a virtual machine instance associated with that virtual computer system service may use the enclave functionality to create an enclave, populate the enclave with data and/or applications 110, obtain keys for decrypting results from the enclave, start the applications 110 within the enclave and receive updates.

The measurements may indicate a current state of the enclave 112 and/or contents within the enclave 112. The measurements may be evaluated within the enclave 112 or may be sent outside the enclave 112. Enclaves may be configured such that measurements are performed entirely within a secure portion of the processors 104 and may also be configured so that the measurements are signed by secret materials provided by the processors 104, such as, for example, microcode running on the processors 104 or a private key. In this way, measurements may be verified as correct by trusted users using the functionality provided with the enclave. Measurements may be verified by, for example, an application programming interface, which may provide information usable to determine the state of the processors 104.

The measurements may be based on measurements obtained from host computer system hardware, such as, for example, measurements obtained by utilizing SGX instructions supported by the processors 104 of the host computer system. In order to obtain the measurement, the enclave 112 may first need to be paused or frozen by halting the execution of applications 110 running within the enclave 112 and/or by placing the applications 110 in a certain determined state. By pausing and/or freezing the applications 110 and/or placing the applications 110 in a determined state, external verification that the enclave 112 and its contents have not been tampered with may be made by comparing the measurements with predicted values. Measurements may include, in some embodiments, verification and/or validation that the measurements were performed by a trusted, verified and/or validated source. For example, measurements performed by the processors 104 executing the appropriate SGX instructions may be digitally signed by the processors 104 and thereby verified as coming from the particular processors 104. Likewise, measurements coming from a TPM may include a similar verifiable signature with the measurements as an assurance that the measurements were performed by the TPM and/or a process running thereon.

The monitoring agent 114, as noted, may be software that facilitates the monitoring of a computer system. In some cases, the computer system being monitored may be a virtual computer system, whereas in other cases the computer system being monitored may be a physical computer system. The monitoring that the monitoring agent performs may include performing anti-virus scans on the monitored computer system, verifying software versions of installed software, performing data loss prevention, communicating with an anti-virus application running on the computer system, collecting usage data about the computer system, such as information about what, by whom, and when various resources of the computer system are accessed, and other types of security monitoring. The monitoring agent may provide information about the monitored computer to a customer of a computing resource service provider running applications on the computer system, the computing resource service provider itself, or a third-party, such as the vendor of a software application running on the computer system. The information communicated to such entity through the input/output module 118 to the entity through the virtual or physical network 120.

In some embodiments, a bootloader application, also referred to as a bootloader agent 116, may be instantiated within the enclave 112, which may, in turn, be configured to locate and/or instantiate other applications, such as the monitoring agent 114, and/or data to be installed within the enclave 112. A bootloader agent 116 may be an application, process, or module that may be configured to locate and instantiate executable code (i.e., bootstrap code) and/or data within a computer system.

The applications 110 and/or data to be installed within the enclave 112 by the bootloader agent 116 may include any applications and/or data as may be required by the customer. In some embodiments, the customers require functionality to store a collection of cryptographic keys within the enclave 112 relating to access of certain stored encrypted data stored. The bootloader agent 116 may instantiate an Application 110 to receive requests for new keys (i.e., bootstrap code for provisioning keying materials), store keys within a file, remove keys from the file and provide copies of those cryptographic keys to authorized users. In some embodiments, the bootloader agent 116 may also instantiate a file of preloaded keys. The encrypted key may be stored within the enclave 112 and only sent outside the enclave 112 using an encryption schema that may only be decrypted by a trusted user with an enclave access key; in this manner, the key may remain safe from interception by any other entity with access to the computer system, thereby ensuring the security of the certain encrypted data. The bootloader agent 116 may also install other applications 110 and data within the enclave 112, including entire virtual computer system instances. For example, in some embodiments, the enclave 112 may be created with an entire virtual machine instance preloaded and configured to run.

In some embodiments, enclaves of a computing resource service provider may be configured with bootstrap code for instantiating other enclaves. In these embodiments, a request may be made to an application programming interface to an enclave 112 to instantiate additional enclaves on additional computer systems. An example of how this embodiment may be used may include providing a method by which a computing resource service provider to quickly provide enclaves to newly-created or re-booted host machines by submitting a request to the application programming interface to instantiate enclaves for newly-created or rebooted host machines.

Applications 110 and/or data installed in the enclave 112 may include applications to provide access to and/or process other types of confidential data. For example, a payment processing application running as a web service on a host computer of a computing resource service provider may be executed in the enclave 112 by first measuring the Application 110, encrypting the Application 110, injecting the Application 110 into the enclave 112, and finally decrypting and running the Application 110 within the enclave 112. Note that the methods of providing access to enclave functionality described are for illustrative purposes and, as such, other methods of providing access to enclave functionality as would be contemplated by a person having ordinary skill in the art may be considered as within the scope of the present disclosure.

The input/output module 118 may include any type of communication channel by which two or more devices may communicate, including physical network cables, wireless communications, universal serial bus (USB), serial, parallel, and other conduits. The network 120 may be any suitable network, including the Internet, an intranet, wide area network (WAN), local area network (LAN), and direct connection. The network may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

In some embodiments, the enclave functionality may be provided as an application, process or module, and may, in some cases, be implemented as a single instance on a computer system providing enclave functionality for virtual machine instances. The application, process or module so configured may also operate on a remote machine and/or may provide enclave functionality in a distributed and/or hierarchical manner. Said application, process or module may further be configured to start automatically when a machine and/or virtual machine is started, or, alternately, may be started as needed (e.g., when a client entity requests access to the enclave functionality).

A computing resource service provider may provide a variety of services to its customers, and its customers may communicate with the computing resource service provider through an interface, which may be a web page or other type of customer interface. Each service of the services provided by the computing resource service provider may have its own interface and subsets of the services may have corresponding individual interfaces in addition to or as an alternative to a common interface. A customer may communicate with the computing resource service provider through a network 120, such as the Internet or intranet.

The computing resource service provider may also provide various computing resources and services to its customers, individually or in combination with other resources and services, and the computing resource service provider may further provide those services to the customer through a distributed computing environment. The services provided by the computing resource service provider may include services such as virtual computer system services, block-level data storage services, cryptography services, on-demand data storage services, notification services, authentication services, policy management services, task services and archival data storage services. Not all embodiments described include all the services described, and additional services may be provided in addition to or as an alternative to services explicitly described.

Services provided by a computing resource service provider may include interfaces that enable a customer to submit requests, for example, through appropriately configured API calls, to the various services. In addition, each of the services may include service interfaces that enable the services to communicate with or access each other (e.g., to enable a virtual computer system of the virtual computer system service to store data in or retrieve data from an on-demand data storage service and/or access block-level data storage devices provided by a block-level data storage service). Each of the service interfaces may also provide secured and/or protected access to each other through the use of encryption keys and/or other secured access methods, thereby enabling secure and/or protected access between them. Collections of services operating in concert on a distributed computer system may have a single front-end interface and/or multiple interfaces between the elements of the distributed computer system.

A computing resource service provider may provide a virtual computer system service that may be a collection of computer resources configured to instantiate virtual machine instances on behalf of the customer. The customer may interact with the virtual computer system service to provision, place and operate virtual machine instances that are instantiated on computer systems operated by the computing resource service provider. The virtual machine instance may be used for various purposes, such as to operate as servers supporting a web site, to operate business applications, or, generally, to provide compute power to the customer. Other applications for the virtual machine instances may be to support database applications, electronic commerce (e-commerce) applications, business applications and/or other applications.

A virtual computer system service may be used by a computing resource service provider for providing computer system resources for customers. The virtual computer system service may provide such computer system resources by instantiating virtual machine instances on physical hardware. The physical hardware may include physical hosts, which may include any device or equipment configured to execute instructions for performing data computation, manipulation or storage tasks, such as a computer or server. A physical host may be equipped with any needed processing capability including processors 104, such as a CPU, GPU, DSP, memory, storage devices, buses, input/output ports, and networking equipment. The physical hardware may also support specialized instructions such as, for example, SGX instructions, TPM instructions or the like.

The enclave 112 of the present disclosure may be used to control the data flowing into or out of a computer system and/or may perform authorization logic for a customer of a computing resource service provider without confidential data, such as unencrypted passwords or decryption keys, being made available to the computing resource service provider. Entities outside of the enclave 112, including the operating system, other applications and/or users, may not access the data stored in the enclave 112, applications 110 processing within the enclave 112 so long as such data resides within the enclave 112. In some embodiments, the data and Application 110 code may be provided to the enclave 112 in encrypted form. In some embodiments, data and/or results of the processing of applications 110 may be output from the enclave 112 in encrypted form. The enclave 112 may receive stored data, for example, from a computer system, process the data according to a particular request from an entity, such as a user, customer, service or application, utilizing executable instructions running within the enclave 112. The stored data may be received in encrypted form, and the processing may include decrypting the stored data using a decryption key held within the enclave 112. Instructions executed within the enclave 112 by a processor may determine whether to provide the data or a subset of the data to the requestor and, based on the determination, may or may not transform the data into another form before providing the data to the requestor. The transformation of the data may entail encrypting the data with the same key as it may have been encrypted with before the enclave 112 received it, encrypting or re-encrypting with a different key, and/or some other transformation of the data, such as censored (e.g., redacted) portions of the data.

In some embodiments, a customer may provide an enclave 112 of the present disclosure with data to be stored in a data store, such as a data store on the data server of the data storage service. In some of these embodiments, the customer may request that the enclave 112 encrypt the data before storing the data. In some of these embodiments usable in combination with other embodiments, instructions executed within the enclave 112 by a processor may encrypt the data by default before storing the data. In a variation of such an embodiment, the customer may ensure that the data is encrypted by the enclave 112 by specifying, for example through an application programming interface call, that the data should pass through an enclave 112 configured for encrypting the data in this manner before being stored to the data store. In another variation of said embodiments, instructions executed within the enclave 112 by a processor may encrypt data by default unless the customer specifies that the data not be encrypted before storing in the data store.

Figure 11:
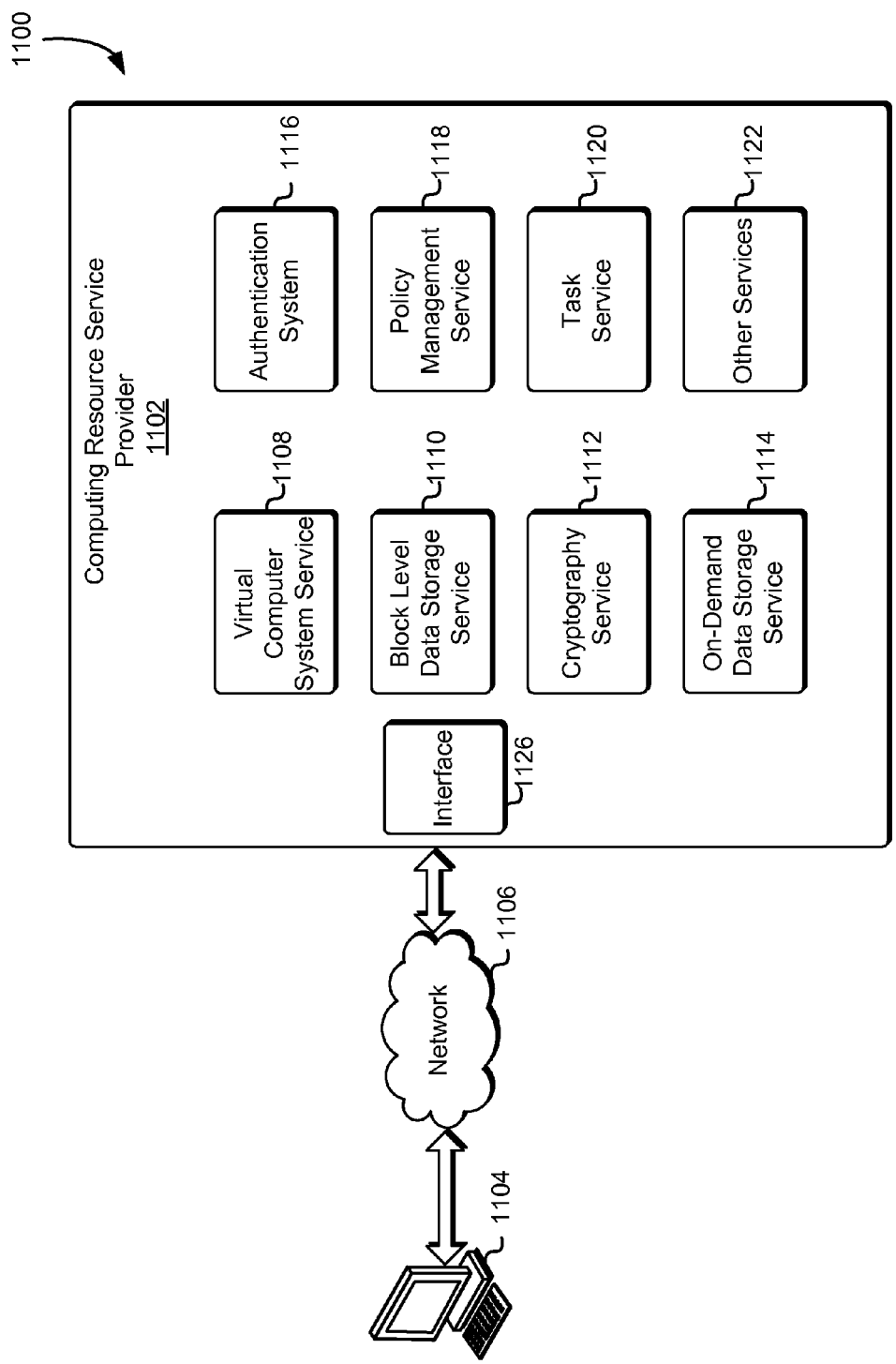
FIG. 11 illustrates an example of a customer connected to a computing resource service provider.

Note that the enclaves of the present disclosure may be used for other services than data storage services, such as services described in conjunction with FIG. 11. For example, enclaves may provide the described functionality for virtual computer system services, block-level data storage services, cryptography services, on-demand data storage services, notification services, authentication services, policy management services, task services, billing services, archival data storage services and/or any other services as would be contemplated by a person having ordinary skill in the art may be considered as within the scope of the present disclosure.

In some embodiments, the customer may have a private key for decrypting stored data in a data store of a data storage service, and in such cases the enclave 112 passes the encrypted data to the customer. In other embodiments, the enclave 112 has the private key and reads from the data store must pass through the enclave 112 for decryption, and, in some embodiments, re-encryption. In some embodiments, both the customer and the enclave 112 may have the private key and the customer may request the cypher text from the data storage service (i.e., request to read the data directly) in order to verify that data is indeed being encrypted and that the key is valid (the same as the enclave 112), by decrypting the cypher text using the private key.

Note that, unless otherwise specified, expressions regarding executable instructions (also referred to as code, applications, agents, etc.) performing operations that instructions do not ordinarily perform unaided (e.g., transmission of data, calculations, and the like) denote that the instructions are being executed by a machine, thereby causing the machine to perform the specified operations.

In some embodiments, the monitoring agent may be provider code selectable by a customer of a computing resource service provider from a user interface or online dashboard for launching when the customer instance is launched. In some embodiments, the monitoring agent is customer-provided code provided to the enclave through an application programming interface provided by the computing resource service provider.

In an embodiment, the monitoring agent may be installed and launched as a condition set by a computing resource service provider on a customer connecting to an instance on a network of the computing resource service provider. In some embodiments, the monitoring agent may be installed and launched as a condition of the customer of the computing resource service provider being allowed to continue to run the instance. In some other embodiment, the monitoring agent may be installed and launched as a condition of the customer being allowed to run the instance for longer than a specified period.

The computing resource service provider may look for indications that the enclave is active and that one or more of the monitoring agents are installed in the enclave. The monitoring agent may have the ability to prove to an outside entity, such as the computing resource service provider or a third-party, whether the monitoring agent is running, is in an approved state, and may be able to make an attestation about the state of the overall computing system. For example, in an embodiment, as a condition to running the customer instance, the monitoring agent may need to confirm that the instance has up-to-date patches, firewall rules, and may periodically need to provide an indication to the computing resource service provider that the monitoring agent is running in the enclave and is in an approved state. In some cases, code within the enclave may be configured to provide keying material to a trusted entity, such as the computing resource service provider, upon attestation that the enclave and/or the monitoring agent is in an approved state.

In some embodiments, as a condition to accessing resources of a computing resource service provider or a condition to accessing a network of the computing resource service provider, the monitoring agent must provide assurances that the monitored instance is compliant. If the monitored instance is non-compliant or if the monitoring agent is determined not to be running, in some embodiments, the instance may be deprovisioned. In another embodiment, if the customer instance is a marketplace instance for selling applications, the monitoring agent may monitor to ensure that the applications are free from viruses or other malicious code, and, if applications are found to contain such viruses or malicious code, the computing resource service provider may take actions including preventing the sale of such applications or disabling the customer marketplace instance.

In some embodiments, the monitoring agent may communicate by making hypercalls to a hypervisor of a virtual computer system service. In some of these embodiments, the communication may be digitally-signed using a cryptographic key accessible to the monitoring agent, such as a cryptographic key within an enclave hosting the monitoring agent. The digitally-signed communication may provide assurance that the communication and the hypercall has not been tampered with or forged. In some of these embodiments, a hypercall handler may authenticate the digital signature of the communication.

In some embodiments, hypercalls made to a hypervisor may cause a bootloader agent to bootstrap (i.e., install and launch) the monitoring agent. In some of those embodiments, the hypercalls may be made from a virtual machine instance (i.e., guest domain) on a host computer system. For example, the hypercall may cause executable code of a bootloader agent to be written to a memory of host computers system or memory allocated to the virtual machine instance. In this example, when the executable code is executed, it may cause the instantiation of an enclave and the installation and the launching of the monitoring agent within the enclave. In some of these embodiments, the executable code may be then erased after the enclave is created and the monitoring agent is launched. In some of these instructions, the monitoring agent may perform monitoring operations, provide a result of its monitoring, and then either the monitoring agent or the bootloader agent may deprovision the enclave and/or the monitoring agent. In some embodiments, the bootloader agent may be scheduled or otherwise executed periodically by applications in the virtual machine instance or by the computing resource service provider.

Figure 2:
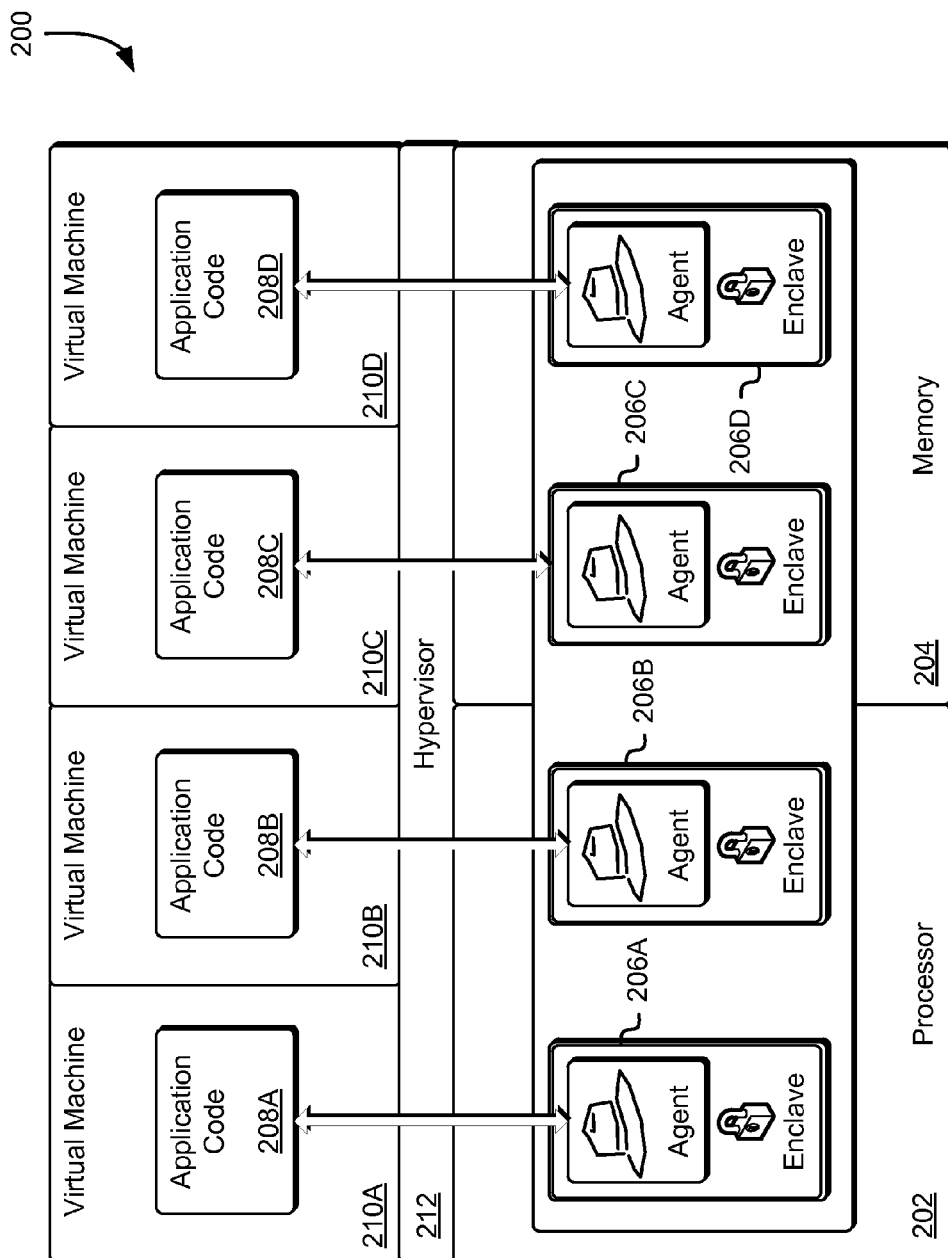
FIG. 2 illustrates an example of computer system hosting virtual machines in accordance with an embodiment.

FIG. 2 illustrates an aspect of an environment 200 in which various embodiments of the present disclosure may be practiced. For the embodiment illustrated in FIG. 2, the environment 200 may include a processor 202 of a computer system having a memory 206 supporting enclaves, such as enclaves 206A-206D, hosting monitoring agents for monitoring application code of computer systems, such as applications 208A-208D running on virtual machines 210A-210D under a virtualization layer, such as a hypervisor 212.

As noted, the processor 202 and memory 204 may be a processor and memory similar to the processor 104 and the memory 106 described in conjunction with FIG. 1. Although the processor 202, memory 204, enclaves 206A-206D, virtual machines 208A-208D are illustrated in FIG. 2 as being located together, the processor 202, memory 204, enclaves 206A-206D, and virtual machines 208A-208D may, in fact, be distributed among computer systems of a distributed computing environment.

The enclaves 206A-206D as depicted in FIG. 2 may be enclaves dedicated to a monitoring agent monitoring a specified virtual machine. For example, a monitoring agent executing within the enclave 206A may monitor the application code 208A of virtual machine 210A; a monitoring agent executing within the enclave 206B may monitor the application code 208B of virtual machine 210B; and so on. In some embodiments, the processor 202 compute power and memory 204 for instantiating the enclaves 206A-206D and running the monitoring agents may be allocated from processor 202 compute power and memory 204 allocated to the respective virtual machine instance. Where the environment 200 is operating within the environment of a computing resource service provider, in such an embodiment, the processor 202 compute power and memory 204 usage may be billed to the customer. In other embodiments, the computing resource service provider may not bill the customer for processor 202 and memory 204 usage by the monitoring agent in the enclave. In some embodiments not depicted, the monitoring agents monitoring their respective virtual machines 210A-210D may be simultaneously executing within a single enclave, such as an enclave instantiated by a computing resource service provider. In such an embodiment, it may be that the compute power for the processor 202 and memory 204 being utilized by the enclave and its monitoring agent may be allocated separately from the processor 202 compute power and memory 204 space allocated to the virtual machines 210A-210D.

The applications 208A-208D may include data, executable code executing in memory or stored in persistent storage, such as an operating system, system and hardware drivers, anti-virus applications, anomaly detection software, software that verifies that other software has been authorized for installation on the computer system, or software that verifies that software installed on the computer system is up-to-date, business applications, gaming and other entertainment applications, streaming media, databases and other applications. In a case where the virtual machines 210A-210D are distributed among multiple computers, the hypervisor 212 may actually be multiple hypervisors distributed among the computer systems. Additionally, although depicted as virtual machines 210A-210D running under the hypervisor 212, the monitoring agents and/or enclaves 206A-206D of the present disclosure is also applicable to physical machines. In some embodiments, the monitoring agent of the present disclosure may be provided as a service within a distributed computing environment by a computing resource service provider.

Figure 3:
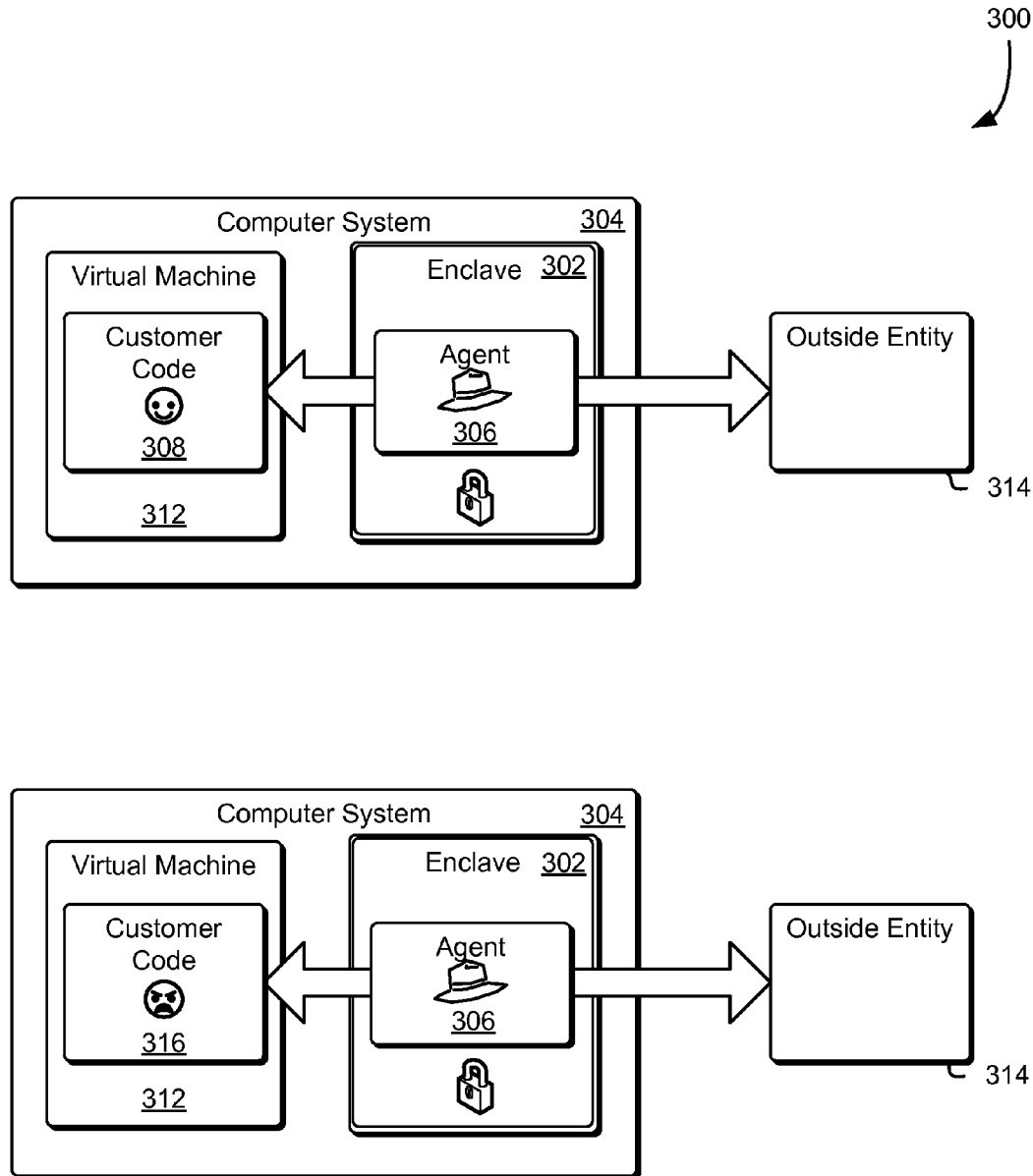
FIG. 3 illustrates an example of a monitoring agent monitoring code in a virtual machine in accordance with an embodiment.

FIG. 3 illustrates an aspect of an environment 300 in which various embodiments of the present disclosure may be practiced. Specifically, FIG. 3 depicts an example of an enclave 302 on a computer system 304 in which the enclave 302 is dedicated to hosting a monitoring agent 306 that monitors customer-provided code 308 running within an instance of a virtual machine 312 and provides results (e.g., assessments) of the monitoring to an outside entity 314, such as a different computer system within a distributed computing environment of a computing resource service provider. Note that the manner of operation of the monitoring agent 306 in the environment 300 in some embodiments may be the same or similar to the operation of the monitoring agent 406 described in conjunction with FIG. 4, and likewise the operation of the monitoring agent 406 in the environment 400 in some embodiments may be the same or similar to the operation of the monitoring agent 306

As noted, the enclave 302 may be considered as a secure execution environment supported by software or hardware, such as Intel® Software Guard eXtensions (SGX), a module such as a trusted platform module (TPM), system microcode. Because the enclave 302 prevents untrusted entities from viewing or tampering with data and executable code within the enclave 302, the monitoring agent 306 may be protected from malicious applications and outside tampering (including tampering by other customer-installed software images). In the particular embodiment illustrated in FIG. 3, the monitoring agent 306 is executing within the enclave 302 without any other code or data. An advantage provided by the monitoring agent 306 having the enclave 302 to itself is that no other code with the potential to interfere with the monitoring would be executing within the enclave 302.

In some embodiments, the instantiation of the enclave 302 may be triggered by a hypercall. In this embodiment, the hypercall may cause instructions to be written to a memory, and the instructions, when executed, may instantiate the enclave 302 whereupon the instructions may be erased from the memory. The hypercall may be executed periodically by the virtual machine instance to cause executable instructions to produce the enclave 302, bootstrap and launch the monitoring agent 306 within the enclave 302, whereupon after the monitoring agent 306 performs its operations and provides its result to the virtual machine instance or other appropriate entity 314, the monitoring agent 306 and the enclave 302 may automatically be deprovisioned.

The computer system 304 may be any device or equipment configured to execute instructions for performing data computation, manipulation or storage tasks, such as a computer or server. Examples of such computers and servers include data servers and other servers including web server 1206 and application server 1208 described in FIG. 12. As mentioned, the computer system 304 may have hardware or software suitable to support the enclave 302.

The monitoring agent 306 may be any suitable code for monitoring a computer system or the virtual machine 312, including anti-virus software, a network access control agent, a data loss prevention agent, an agent that monitors whether the virtual machine has up-to-date software, operating system, drivers, and/or firewall patches, an intrusion-detection system, or any of the monitoring agents described as well as any type of monitoring code as would be contemplated by a person having ordinary skill in the art. The monitoring agent 306 may provide a result of its monitoring operations to the outside entity 314, which may be a computing resource service provider, a customer of the computing resource service provider, a third-party vendor of code 308 installed on the computer or the virtual machine 312, or any similar such entity. The result may comprise an assessment whether the code 308 or data is compliant code 308 or non-compliant 316. The outside entity 314 may take some action based on the result of the assessment. For example, if the outside entity 314 is a computing resource service provider, the computing resource service provider may suspend the customer's virtual machine instance for non-compliance with a condition of operation. In another example, an assessment of non-compliance may result in a change to the accounting records of the non-compliant 316 customer virtual machine instance; e.g., the computing resource service provider may have conditioned a particular billing rate on the customer not storing file types over a specified size in the virtual machine instance, whereupon when the monitoring agent 306 detects files over the specified size, the customer account may be switched to a different billing rate.

As noted, the customer-provided code 308 may be software applications, such as anti-virus applications, credit card information, credit card processing software, data loss prevention code, anomaly detection software, software that verifies that other software has been authorized for installation on the computer system, or software that verifies that software installed on the computer system is up-to-date, operating systems, or virtual machines. Furthermore, the customer-provided code 308 may further comprise any data, such as may be stored in files, databases, and/or memory. The virtual machine 312 may be a virtual machine of a virtual computer system service of a computing resource service provider. The virtual machine may further be accompanied by additional services, such as data storage services, including block-level data storage services, on-demand data storage services and archival storage services, which additionally may be monitored by the monitoring agent 306. As noted, the outside entity 314 may be a computing resource service provider, a customer of the computing resource service provider, a third-party vendor of data or code 308. Further, the outside entity 314, such as the computing resource service provider, may condition the access to certain resources, such as the ability to communicate through the network of the provider or utilize further computer capacity of the computing resource service provider, on the assurance that the virtual machine instance is compliant with whatever conditions set by the computing resource service provider.

Figure 4:
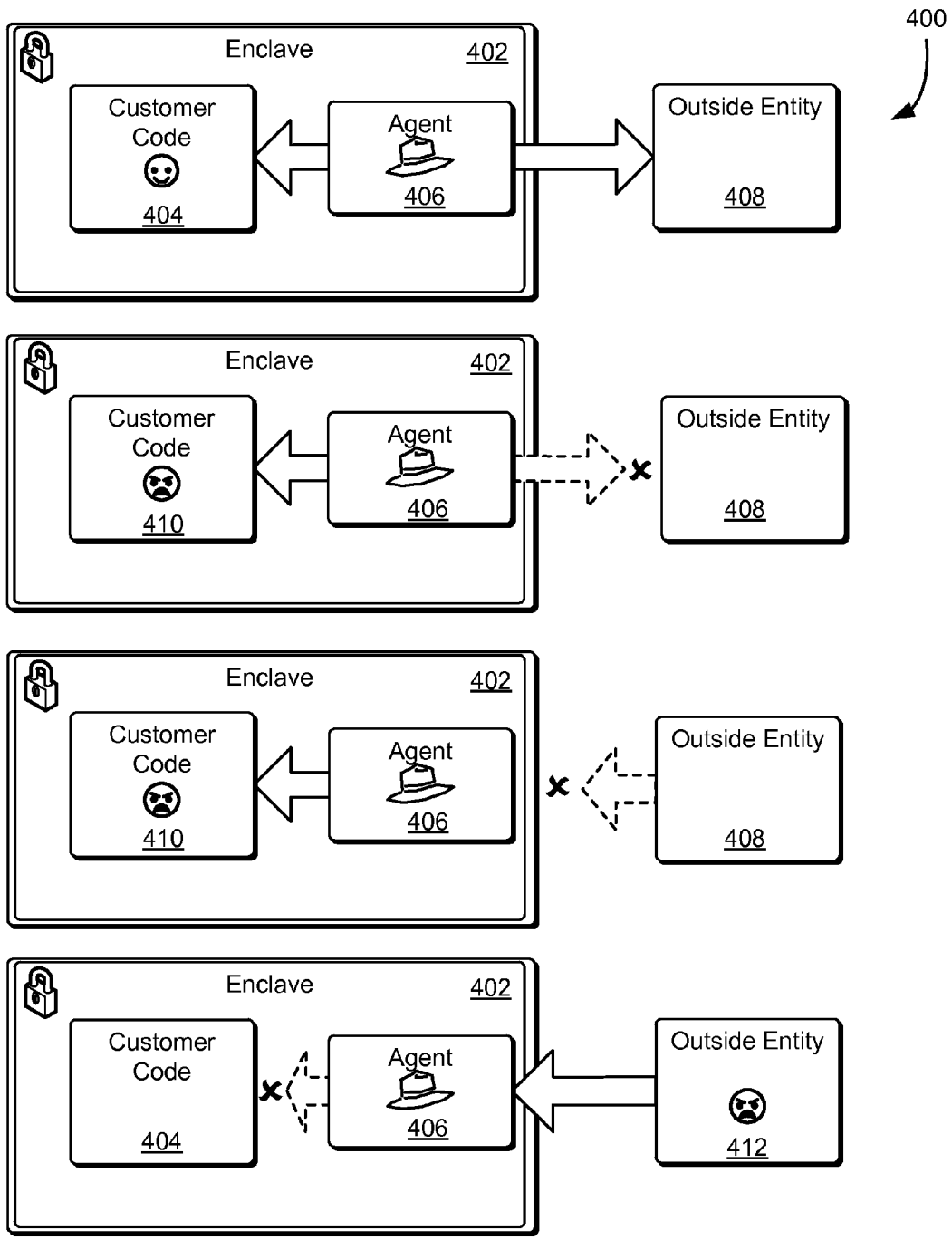
FIG. 4 illustrates an example of a monitoring agent monitoring code in an enclave in accordance with an embodiment.

FIG. 4 illustrates an aspect of an environment 400 in which various embodiments of the present disclosure may be practiced. Specifically, FIG. 4 depicts an example of an enclave 402 instantiated by a customer for running customer-provided code 404 where the customer-provided code 404 is monitored by a monitoring agent 406, which may be code provided by the customer, or a computing resource service provider or a third-party at the behest of the customer. Note that the manner of operation of the monitoring agent 406 in the environment 400 in some embodiments may be the same or similar to the operation of the monitoring agent 306 described in conjunction with FIG. 3, and likewise the operation of the monitoring agent 306 in the environment 300 in some embodiments may be the same or similar to the operation of the monitoring agent 406. As noted, the enclave 402 may be considered as a secure execution environment supported by software or hardware, such as Intel® Software Guard eXtensions (SGX), a module such as a trusted platform module (TPM), system microcode or a hypervisor configured to support management of secure execution environments. The nature of the enclave 402 is such that, normally, applications and data executing inside the enclave 402 cannot be observed by entities outside the enclave 402. Thus, although a trusted entity may be able to put data into the enclave 402 and receive output from applications within the enclave 402, the data and code within the enclave 402 is not generally viewable to outside parties. However, in the present embodiment, the monitoring agent 406 may be installed inside the enclave 402 and because the monitoring agent 406 is not outside the enclave 402, the monitoring agent 406 may be able to view and assess the customer-provided code 404 executing inside the enclave 402 and provide its assessment and other information about the customer-provided code 404 or data to outside entities.

For example, in an embodiment where the monitoring agent 406 is an anti-virus application, the monitoring agent 406 may periodically scan the customer-provided code 404 for the presence of viruses. Data being output from the customer-provided code 404 to an outside entity 408 may be further scanned for viruses by the monitoring agent 406 and, if no viruses are found, the data may be passed along to the outside entity 408. In some cases, where the monitoring agent 406 determines the customer-provided code 404 or the data being passed to the outside entity 408 to be non-compliant 410 (e.g., the data contains a virus, the data is prohibited from being passed to the outside entity 408 according to a data loss prevention rule, etc.), the monitoring agent 406 may initiate some operation in accordance with the type of non-compliance. For example, the monitoring agent 406 may have determined that the customer-provided code is non-compliant because it contains a netbot for performing distributed denial of services attacks and the monitoring agent 406 may prevent the non-compliant customer-provided code from communicating to the outside entity 408. As another example, the monitoring agent 406 may take an action notifying a customer, service, or resource that placed the non-compliant customer-provided code into the enclave 402 that the code is non-compliant (e.g., notifying the customer that the non-compliant code has memory leaks, notifying the customer that the non-compliant code is in an unstable state, notifying the customer that the non-compliant code is consuming excessive compute power, etc.). In another embodiment, the monitoring agent 406 may prevent the outside entity 408 from communicating to the non-compliant code within the enclave 402. In yet another embodiment, the monitoring agent 406 may examine, for compliance, code or data being sent into the (e.g., may scan incoming code for viruses) by an outside entity 412 and, if the incoming code or data from the outside entity 412 is determined as being non-compliant, the monitoring agent 406 may prevent the non-compliant code or data from being instantiated in the enclave 402 or passed to the customer-provided code 404.

The customer-provided code 404 may be any code suitable for running in the enclave 402. The customer-provided code 404 may be provided by the customer, may be provided to the customer by a computing resource service provider, or may be a third-party application placed within the enclave 402 by the customer. Note that, although the term "customer" is used concerning FIG. 4, the customer may, in some embodiments be the computing resource service provider or other user of a computing device hosting the enclave 402.

The monitoring agent 406 may be anti-virus or anti-malware application, data loss prevention software, software firewalls, software provided by a customer or computing resource service provider for monitoring corporate policy compliance and/or compliance with service-level agreements (e.g., software that verifies that other software has been authorized for installation on the computer system, software that verifies that software installed on the computer system is up-to-date, etc.), host intrusion detection applications, anomaly detection software, vulnerability assessment software, or any of the monitoring agents described as well as any type of monitoring code as would be contemplated by a person having ordinary skill in the art. The outside entity 408 and outside entity 412 depicted in the environment 400 of FIG. 4 may be a computing resource service provider, a customer of a computing resource service provider, a client of the customer, a service, a resource, a software application, electronic device, network, or web site residing outside the enclave 402. The customer-provided code 404 may include data and/or software applications, such as anti-virus applications, credit card information, credit card processing software, data loss prevention code, anomaly detection software, software that verifies that other software has been authorized for installation on the computer system, software that verifies that software installed on the computer system is up-to-date, operating systems, or virtual machines instantiated within the enclave 402.

In some embodiments, the monitoring agent may be code provided by a customer of a computing resource service provider. In other embodiments, the monitoring agent may be code provided by the computing resource service provider. In still other embodiments, the monitoring agent may be code provided by a third-party software provider.

Figure 5:
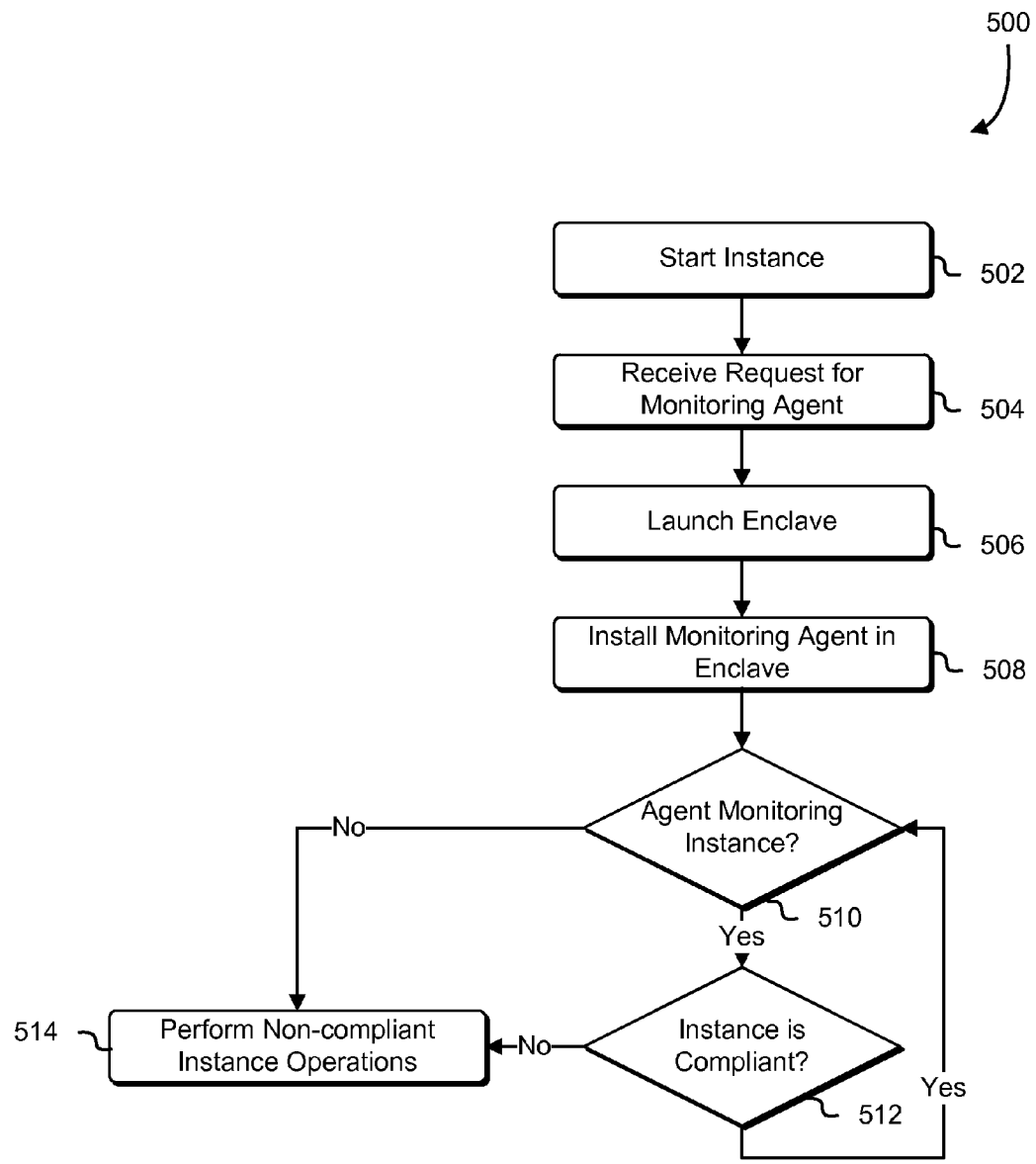
FIG. 5 is a flow chart that illustrates an example of a monitoring agent monitoring an instance in accordance with an embodiment.

FIG. 5 is a flow chart illustrating an example of a process 500 for installation and operation of a monitoring agent in accordance with various embodiments. The process 500 may be performed by any suitable system such as such as a data server, application server or web server, such as the application server 1208 and web server 1206, or any electronic client device such as the electronic client device 1202 described in conjunction with FIG. 12. The process 500 includes a series of operations in which a monitoring agent is launched within an enclave to monitor an instance. In 502, an instance is started such as a virtual machine instance of a virtual computer system service of a computing resource service provider. The instance may be instantiated at the request of a customer or other user of the virtual computer system service.

In 504, the system performing the process 500 receives a request to monitor the instance using a monitoring agent of the present disclosure. Note that the request received may be a call to an application programming interface to launch a monitoring agent, a hypercall, or some other mode of making such a request. The request may come from a user, customer, provider, service, resource, application or other entity with sufficient authority to make the request. As an example, a customer may have agreed to a certain billing rate with a computing resource service provider on the condition that the customer instance remains compliant with specified compliance rules, such as running a particular third-party application within the instance. In this example, the computing resource service provider may request that the system performing the process 5 launch a monitoring agent to monitor the customer instance to assure the computing resource service provider that the customer instance remains compliant with the agreed-upon conditions. In another example, the customer may have an anti-virus program the customer wants to have launched within an enclave to operate as a monitoring agent on the customer's own instance. In still another embodiment, a monitoring agent for a third-party application may be packaged with the third-party application (e.g., the monitoring agent could be an application that monitors the third-party application and reports application crashes or errors to a vendor of the third-party application for product support or quality improvement purposes), and as that third-party application is installed, the application may make the request to launch the monitoring agent.

In 506, an enclave may be launched for hosting the monitoring agent monitoring the instance. In some embodiments, the operations performed in 506 may not involve an enclave, but, rather, the monitoring agent may be installed in some other environment, such as in a controlling domain or a separate guest domain of the computer system. In some cases, the enclave may be launched as a part of the domain of the instance; that is, a hypervisor of the virtual computer system service that allocates and manages processing power and memory for the virtual machine instance may further allocate the enclave to the virtual machine instance such that the enclave may share compute and memory resources with the instance, and a customer of the instance may incur usage costs from resource usage by the monitoring agent within the enclave. In other cases, the enclave may be launched separately and be allocated separate resources than the resources allocated to the instance. In either case, the computing resource service provider may choose from a variety of billing options, such as not billing for the enclave and/or monitoring agent usage costs, billing the customer for the usage costs, or billing a third-party for the enclave and/or monitoring agent usage costs depending on the embodiment.

In 508, the monitoring agent may be installed within the enclave or, in an embodiment where 506 does not launch an enclave, install the monitoring agent in the relevant environment of the embodiment. As noted, the monitoring agent of 508 may be any type of application suitable for monitoring an instance as described in the present disclosure, examples including computing resource service provider code, customer-provided code, and third-party code. In some embodiments, a bootloader agent is executed by processors in memory of a computer system to establish the enclave with the code that generates cryptographic key material, authenticates itself with a remote entity, retrieves encrypted code from the remote entity for running the monitoring agent that may be decrypted using some of the generated cryptographic key material, and executes the decrypted code.

In 510, the system performing the process 500 determines whether the monitoring agent is properly monitoring the instance. Examples of reasons why the monitoring agent may not be properly monitoring the instance include a situation where an error occurred in installing the monitoring agent and the installation did not complete properly, some entity, such as the customer, a user or an application, interfering with the monitoring of the monitoring agent, or the monitoring agent being in an unstable state. If the monitoring agent is properly monitoring the instance, the system performing the process 500 proceeds to 512 where a level of compliance of the instance may be determined by the monitoring agent. For example, the monitoring agent determines whether the instance may contain a virus, or in another example, a third-party monitoring agent may determine whether a third-party application running in the instance may have crashed.

If the instance or whatever in the instance is being monitored by the monitoring agent is determined to be compliant, the system performing the process 500 returns to 510 where the system checks again whether the monitoring agent is still properly monitoring the instance as described above. Otherwise, if the monitoring agent is not properly monitoring the instance per the operations of 510 or the instance is determined to be compliant, according to the operations of 512, the system performing the process 500 proceeds to 514 where different actions may be taken according to the state of the monitoring agent or the type of non-compliance detected. For example, if the monitoring agent was launched according to an agreement to certain conditions between a customer and a computing resource service provider, and the monitoring agent cannot properly monitor, as determined in 510, the instance due to interference with the monitoring by the customer, the operations of 514 may include a variety of operations, including termination of the instance, changing the customer account to a different billing rate, or sending a notification to the customer advising the customer of the non-compliance. As another example, if the monitoring agent is an anti-virus program and the monitoring agent determines in 512 that the instance contains a virus, the operations of 514 may include sending a notice to the customer that the instance contains a virus, blocking the instance from network communications, wiping and replacing the instance with a clean copy of the instance, or some other operation.

In some embodiments, the behavior of another computer system or virtual machine instance may be dependent upon the state of the system or code being monitored by the monitoring agent. In some of these embodiments, the other computer system or virtual machine instance may request information (e.g., measurements, etc.) about the state of the system or code being monitored from the monitoring agent and, based on the response from the monitoring agent, the other computer system or virtual machine instance may perform or may not perform some operation. For example, in a situation where the system or the code being monitored by the monitoring agent is utilized for processing credit card transactions and the other computer system or virtual machine instance is configured to provide the system or code being monitored with credit card data, information received from the monitoring agent indicating that the credit card processing system or code has been tampered with or otherwise not in a compliant state may cause the other computer system or virtual machine instance to stop providing the credit card data to the system or code being monitored as a data loss prevention measure, In some embodiments, the monitoring agent may be executable code from a third-party that may be obtained, separately or bundled with other third-party software, from a marketplace. In such an embodiment, the marketplace may be an online marketplace hosted by the computing resource service provider. Furthermore, the rules governing the operation and type of monitoring to be performed by the monitoring agent may be defined by the third party. For example, the monitoring agent may be an application provided by a supplier of credit card processing software and the agent may be configured to monitor a virtual machine instance to ensure that data sent to or from the instance is compliant with payment card industry data security standards.

Note that the operations performed in 502-512 may be performed in various orders, including in parallel. Note also that, unless otherwise specified, expressions regarding executable instructions (also referred to as code, applications, agents, etc.) performing operations that instructions do not ordinarily perform unaided (e.g., transmission of data, calculations, and the like) denote that the instructions are being executed by a machine, and thereby cause the machine to perform the specified operations.

Figure 6:
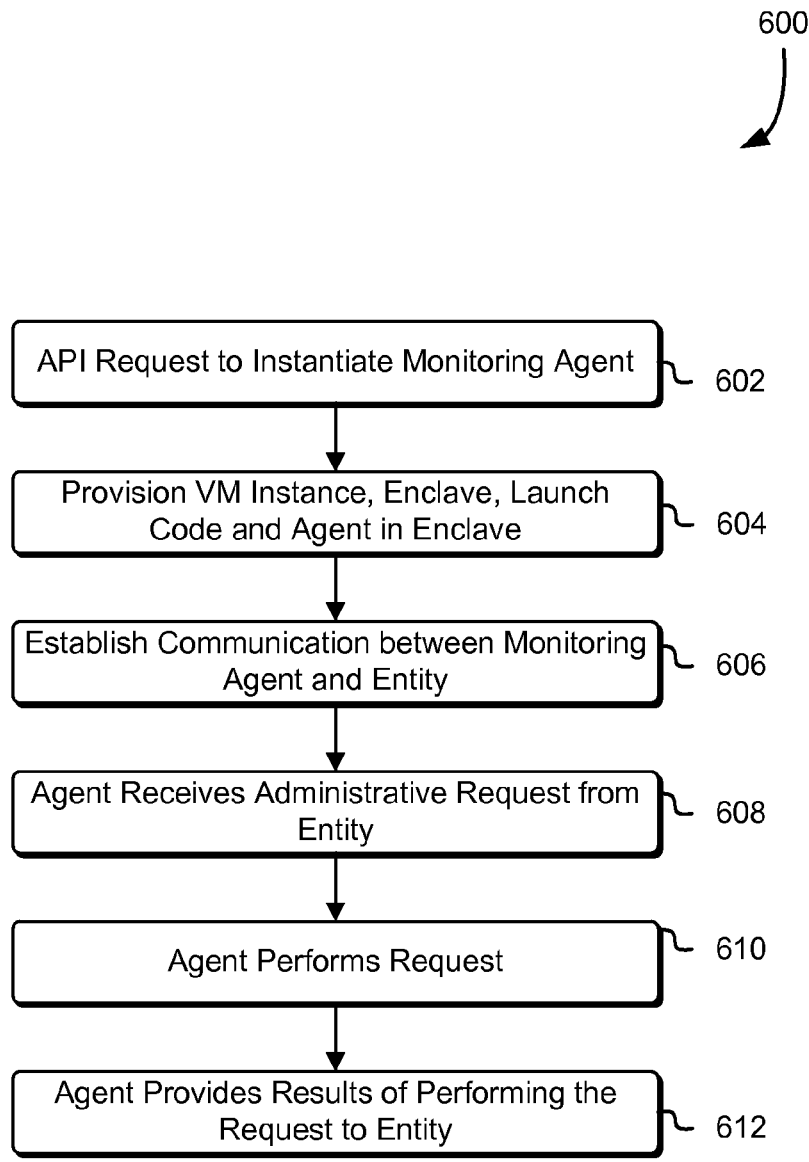
FIG. 6 is a block diagram that illustrates an example of instantiating a monitoring agent in response to a request in accordance with an embodiment.

FIG. 6 is a block diagram illustrating an example of a process 600 for providing a monitoring agent as a service in accordance with various embodiments. The process 600 may be performed by any suitable system such as a data server, application server or web server, such as the application server 1208 and web server 1206, or any electronic client device such as the electronic client device 1202 described in conjunction with FIG. 12. The process 600 includes a series of operations in which a request for a monitoring agent is made, the monitoring agent is provisioned under the control of a requestor, and the monitoring agent provides information to the requestor. In 602, the system performing the process receives a request to instantiate a monitoring agent. The request may be made through a service offered by a computing resource service provider. In some cases, the monitoring agent service may be a service purchasable by a customer of the computing resource service provider. In other cases, the service may be a feature provided at no cost by the computing resource service provider, while in still other cases the computing resource service provider may offer a discount or provide other incentives to the customer in exchange for consent to have the customer's instance monitored by the monitoring agent. Although illustrated in 602 as receiving the request via an application programming interface, as noted in process 500, the request may be in the form of a hypercall or some other mode of making such a request as would be understood by a person having ordinary skill in the art.

In 604, the virtual machine instance, enclave, and agent may be provisioned. The operations at 604 may be performed similar to the operations 504-510 described in reference to FIG. 5. In 606, a means of communication between the monitoring agent and an entity to which the monitoring agent is configured to communicate, such as a computing resource service provider, may be established. The manner of communication may include the monitoring agent writing to and/or reading from a memory region shared by the monitoring agent and the entity, exchanging ciphertext and/or digitally-signed messages between the monitoring agent and the entity, and the entity and/or the monitoring agent hold cryptographic keys sufficient to decrypt, encrypt, and/or verify the ciphertext and/or digitally-signed messages, and any other modes of exchanging messages between the monitoring agent and the entity as would be understood by a person having ordinary skill in the art.

Once a manner of communication is established in 606, the operations of 608 may include the entity providing instructions (i.e., administrative requests) to the monitoring agent. Examples of administrative requests may include a request to increase or decrease the frequency of monitoring, an update to code or data of the monitoring agent (e.g., updates to anti-virus definitions in the case of the monitoring agent being an anti-virus application, etc.), commands to start or stop monitoring and commands to exit and deprovision the enclave. As noted, the requests may come from any entity with sufficient privileges to make such requests from the monitoring agent, including a computing resource service provider, a customer of the computing resource service provider, or a third-party entity, depending on the embodiment.

In 610, the monitoring agent performs the requested action. For example, the monitoring agent may update its anti-virus definitions, install a new version of itself, increase/decrease the frequency of monitoring, switch its monitoring to a different instance or other administrative requests as may be received in 608. Finally, in 612, the monitoring agent may provide the requesting entity with some status as a result of performing the requested action. For example, the monitoring agent may respond through the communication channel established in 606 that the request was received and/or successfully performed, or, if unsuccessfully performed, may respond with an error code.

Figure 7:
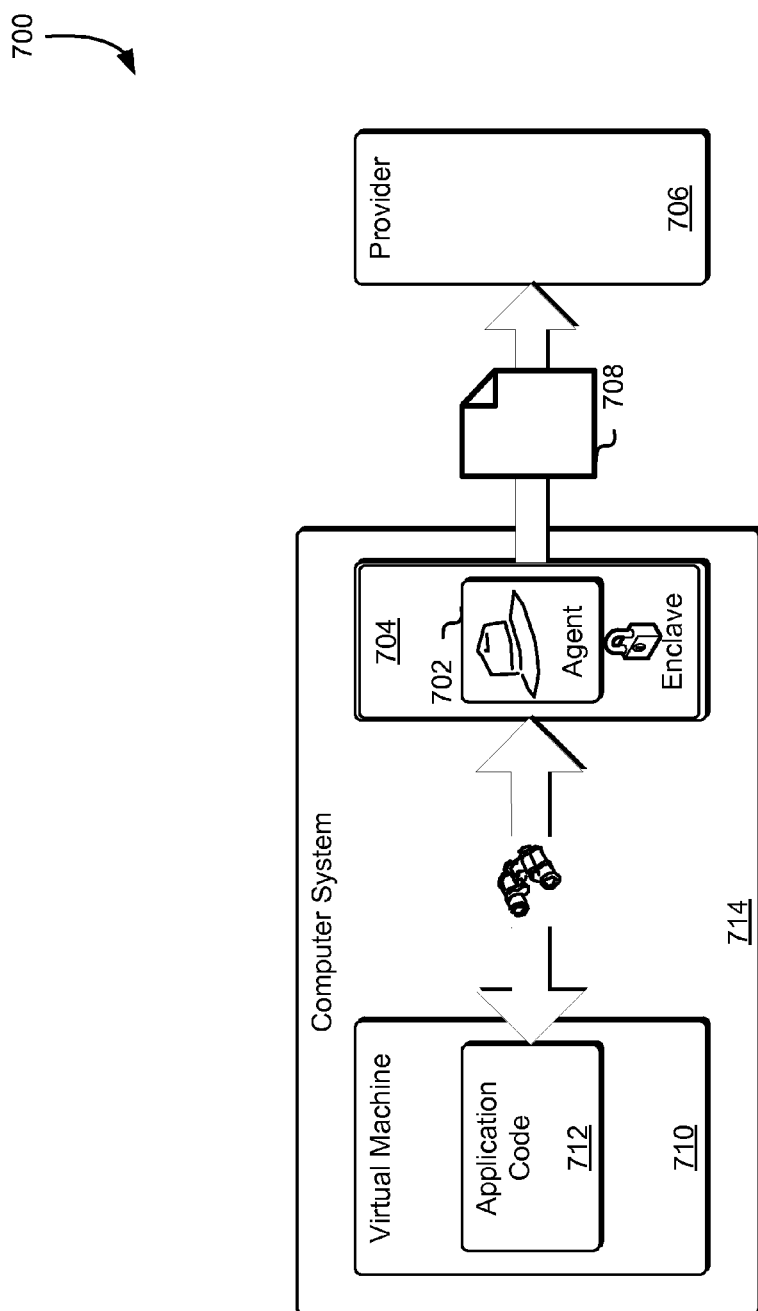
FIG. 7 illustrates an example of a monitoring agent gathering information about a virtual machine in accordance with an embodiment.

FIG. 7 illustrates another aspect of the present disclosure in which various embodiments of the present disclosure may be practiced. Specifically, FIG. 7 depicts an environment 700 in which a monitoring agent 702, which may be installed within an enclave 704, may provide, to an entity, such as provider 706, usage metrics 708 about a virtual machine instance 710 hosting data and applications 712 on a computer system 714. The monitoring agent 702 may be any software application suitable for monitoring a physical or virtual machine and report the usage metrics 708 to an entity, like the provider 706. Rather than monitoring the virtual machine instance 710 for adherence to compliance rules, the monitoring agent 702 in this aspect gathers information about the ways that the virtual machine instance 710 is being used.

The monitoring agent 702 is depicted as being within the enclave 704 in FIG. 7, however in some embodiments the monitoring agent 702 may not be installed in an enclave on the same computer system 714 as the virtual machine instance 710 or in an enclave at all; e.g., the monitoring agent 702 may be operating on a machine remotely located from the computer system 714, may be instantiated separately from the virtual machine instance 710 but not in the enclave 704, or may be instantiated as part of the virtual machine instance 710. An advantage of running the monitoring agent 702 within the enclave 704 as a part of the virtual machine instance 710 may be that the enclave 704 provides assurances that the monitoring agent 702 cannot be viewed or tampered with by outside entities. In some embodiments, the enclave 704 and the monitoring agent 702 may be allocated compute resources from the compute resources allocated to the virtual machine instance 710 such that usage costs incurred by the monitoring agent 702 and/or the enclave 704 may be billed to the customer. As noted, the enclave 704 may be a secure execution environment supported by hardware or software instructions, such as Intel® Software Guard eXtensions (SGX), a module such as a trusted platform module (TPM), system microcode.

The provider 706 may utilize the monitoring agent 702 for gathering the usage metrics 708 regarding the use of resources by the customer and/or clients of the customer, which may be used for a variety of purposes. The usage metrics 708 may contain information useful to the customer for making product marketing decisions, minimizing usage costs and designing application. For example, the provider 706 may offer, as a service to the virtual machine customer, the usage metrics 708 gathered from the customer's virtual machine instance 710, and the customer may use the usage metrics 708 to improve products offered to clients, improve website design, or determine whether resources are being over-utilized or underutilized. The types of usage metrics that may be utilized includes resource usage, occurrences of search terms, how applications 712 running within the virtual machine instance 710 behave under different workloads and site traffic patterns of clients of the customer.

In some cases, the usage metrics 708 may be useful to a computing resource service provider for similar reasons; e.g., for determining traffic patterns of clients of the customer, determining key search terms used by the customer and/or the clients, etc. Likewise, a third-party software provider may benefit from information related to the usage of the third-party's software applications used within the instance or on a computer system. In exchange for such information, the customer may pay value to a computing resource service provider or third-party software provider. Likewise, a computing resource service provider or software vendor may provide economic incentives to the customer to allow the computing resource service provider and/or the software provider to collect such information. In some embodiments, the monitoring agent 702 may be gathering the usage metrics 708 for the computing resource service provider 706 or a third-party and the computing resource service provider 706 may provide an option to the customer to allow the monitoring agent 702 to gather the usage metrics 708 in exchange for a discount on the billing of the customer's virtual machine instance 710. In other embodiments, the usage metrics 708 may be collected for the computing resource service provider 706 or a third-party which may sell the usage metrics 708 to the customer, in some cases the usage metrics 708 sold to the customer may include additional analysis of the usage metrics 708 provided by the computing resource service provider 706 and/or the third-party. In other cases, the usage metrics 708 may be provided directly to the customer.

The data and applications 712 include any data and applications that may be stored and/or executed on a physical or virtual machine, and as noted, the virtual machine instance 710 may alternately be a physical machine. The computer system 714 may be any device or equipment configured to execute instructions for performing data computation, manipulation or storage tasks, such as a computer or server. Examples of such computers and servers include data servers and other servers including web server 1206 and application server 1208 described in FIG. 12. As mentioned, the computer system 714 may have hardware or software suitable to support the enclave 704.

As noted, in this aspect of the present disclosure, a computing resource service provider may offer compute capacity to a customer. The compute capacity may potentially be contained within layers of protection or obfuscation, such as in an enclave. The compute capacity may be provided by the computing resource service provider or software may be provided by a third-party software vendor for consideration or at a discount depending on a level of insight by a monitoring agent into the compute capacity permitted by the customer. In some embodiments, the compute capacity may be a virtual machine instance. In other embodiments, the compute capacity may be a measured and attested virtual machine instance in an enclave. In some embodiments, the monitoring agent assesses the compute capacity from within an enclave.

In some of these embodiments, the monitoring agent runs within an enclave instantiated by the customer and collects information about customer-provided code and/or data within the instantiated customer enclave. In other embodiments, the monitoring agent is instantiated in its own enclave, and collects information about customer compute capacity not running in an enclave. In some cases, a computing resource service provider may collect usage information for user by the computing resource service provider to determine how usage of the customer compute capacity affects the network, resources, and other customers of the computing resource service provider. In other cases, the computing resource service provider may analyze the information collected about the compute capacity and provide advice to the customer based on the analysis. For example, if the customer has a marketplace instance, the computing resource service provider may analyze usage metrics of the marketplace instance and provide feedback about the performance of the customer's marketplace, in some cases in exchange for value. For example, the customer may run a blogging site within the customer instance and the monitoring agent may collect usage metrics that allows the computing resource service provider to inform the customer that the clients of the customer are generating N-thousand hits to the customer's site. In some cases, a software provider, such as a provider of database software, may provide their software to the customer for use in the customer's instance for free, for a discount, or for payment in exchange for allowing the monitoring agent to collect for the software provider information about how the database software is being used by the customer. In some embodiments, the third-party software and monitoring agent may be obtained from a marketplace, such as an online marketplace hosted by the computing resource service provider.

In some embodiments, incentives for allowing the monitoring agent to monitor customer compute capacity may vary according to the level of insight the customer allows the monitoring agent to have. For example, there may be one incentive if the customer allows a summarization of usage metrics to be provided by the monitoring agent, whereas there may be a different incentive if the customer allows raw data collected by the monitoring agent to be provided.

Figure 8:
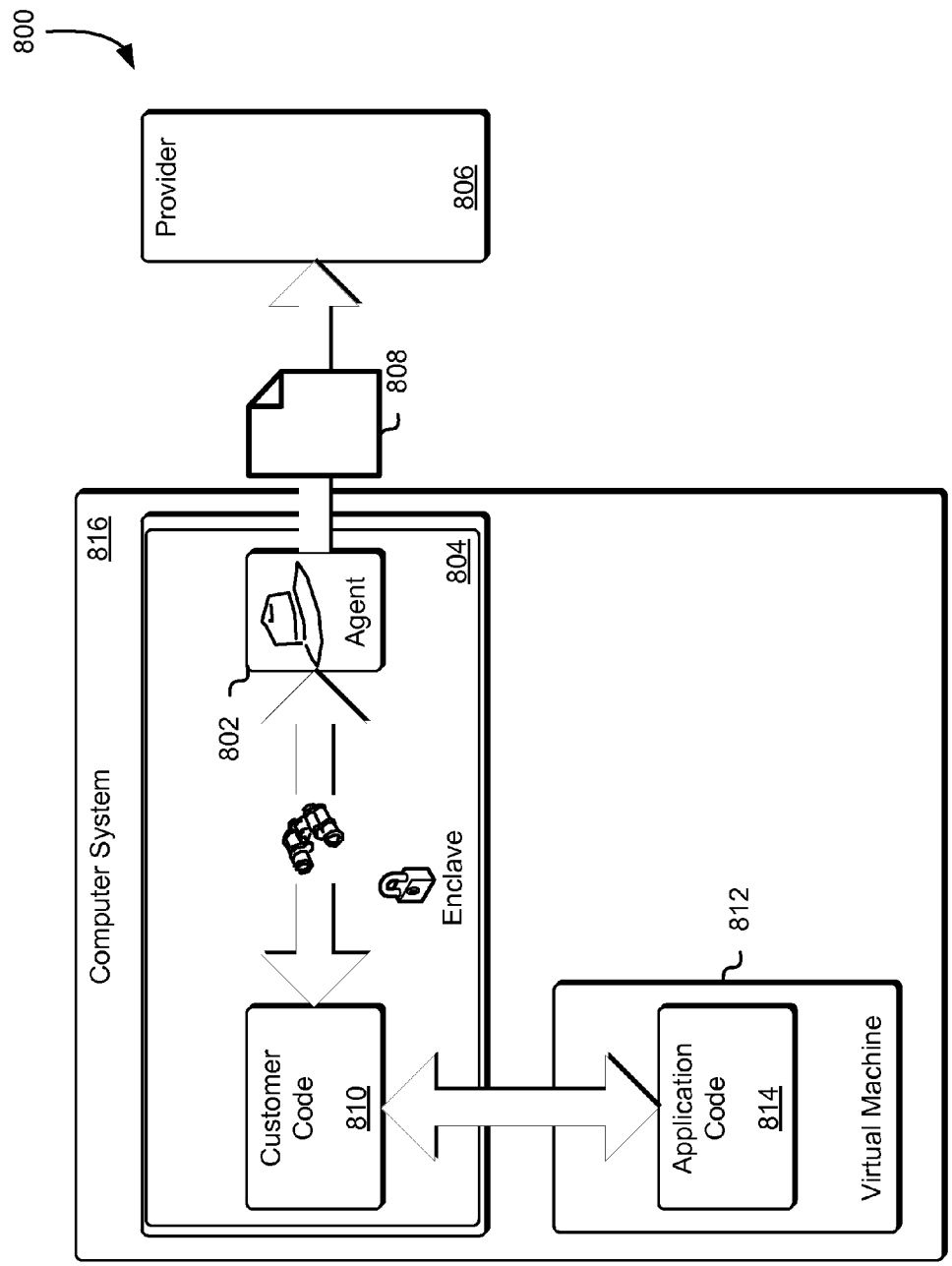
FIG. 8 illustrates an example of a monitoring agent gathering information about code in an enclave in accordance with an embodiment.

FIG. 8 illustrates another aspect of the present disclosure in which various embodiments of the present disclosure may be practiced. Specifically, FIG. 8 depicts an environment 800 in which a monitoring agent 802, which may be installed within an enclave 804, may provide, to an entity, such as provider 806, with information 808 about customer data or code 810 also executing in the enclave for a virtual machine instance 812 hosting data and applications 814 on a computer system 816. The 802 may be any application suitable for monitoring other applications and/or data in an enclave. Because applications and data within the enclave may not me viewable or accessible to outside entities, an outside entity, such as the computing resource service provider, may be unable to obtain reliable metrics and other information regarding the customer's usage of the resources provided by the computing resource service provider. However, if the monitoring agent were to be running within the same enclave as the customer data or code, the monitoring agent may be able to provide such information to an appropriate outside entity, like the computing resource service provider. As an incentive for allowing the computing resource service provider to run the monitoring agent within the enclave hosting the customer data or code, the computing resource service provider may provide the customer with a bonus or different billing structure for virtual machine or other resource usage than the customer may otherwise receive.

The enclave 804, as noted, may be a secure execution environment supported by hardware or software instructions, such as Intel® Software Guard eXtensions (SGX), a module such as a trusted platform module (TPM), system microcode or a hypervisor configured to manage secure execution environments. The customer data or code may be any customer data or code that may be placed within an enclave. In some cases, the customer may have placed the entire operating system or, in some cases, the virtual machine instance itself, within an enclave.

The provider 806 may be a computing resource service provider. In some cases, the role depicted as the provider in FIG. 8 may be a third-party entity. For example, a software vendor may have a program whereby the vendor's software may be offered to the customers of the computing resource service provider by the computing resource service provider, and, in exchange for allowing the monitoring agent to gather information about the usage of the vendor's software, which may be represented by either or both of the data or code or the data and applications, the vendor may provide the software at a discount to the customer or the computing resource service provider or, in some cases, may pay the customer or the computing resource service provider for this service.

The information 808 may be statistics, measurements, metrics, and other usage data about the manner in which the customer data or code is being used. By having visibility to the customer data or code within the enclave, the computing resource service provider may be able to make more informed marketing decisions regarding the use of enclaves within the computing resource service provider's environment 800. As noted, the customer data or code 810 may be any type of data or application that may be placed within an enclave, including drivers, third-party software, databases, and operating systems.

The virtual machine instance 812 may host the data and applications separate from the data or code within the enclave. In some embodiments, however, the entire operating system of the virtual machine instance may be within the enclave, and the data or applications may not be present or may be a bootloader for the virtual machine instance. Although depicted in FIG. 8 as a virtual machine instance, the present disclosure may also apply to a physical machine.

The computer system 816 may be any device or equipment configured to execute instructions for performing data computation, manipulation or storage tasks, such as a computer or server. Examples of such computers and servers include data servers and other servers including web server 1206 and application server 1208 described in FIG. 12. As mentioned, the computer system 816 may have hardware or software suitable to support the enclave 804.

Figure 9:
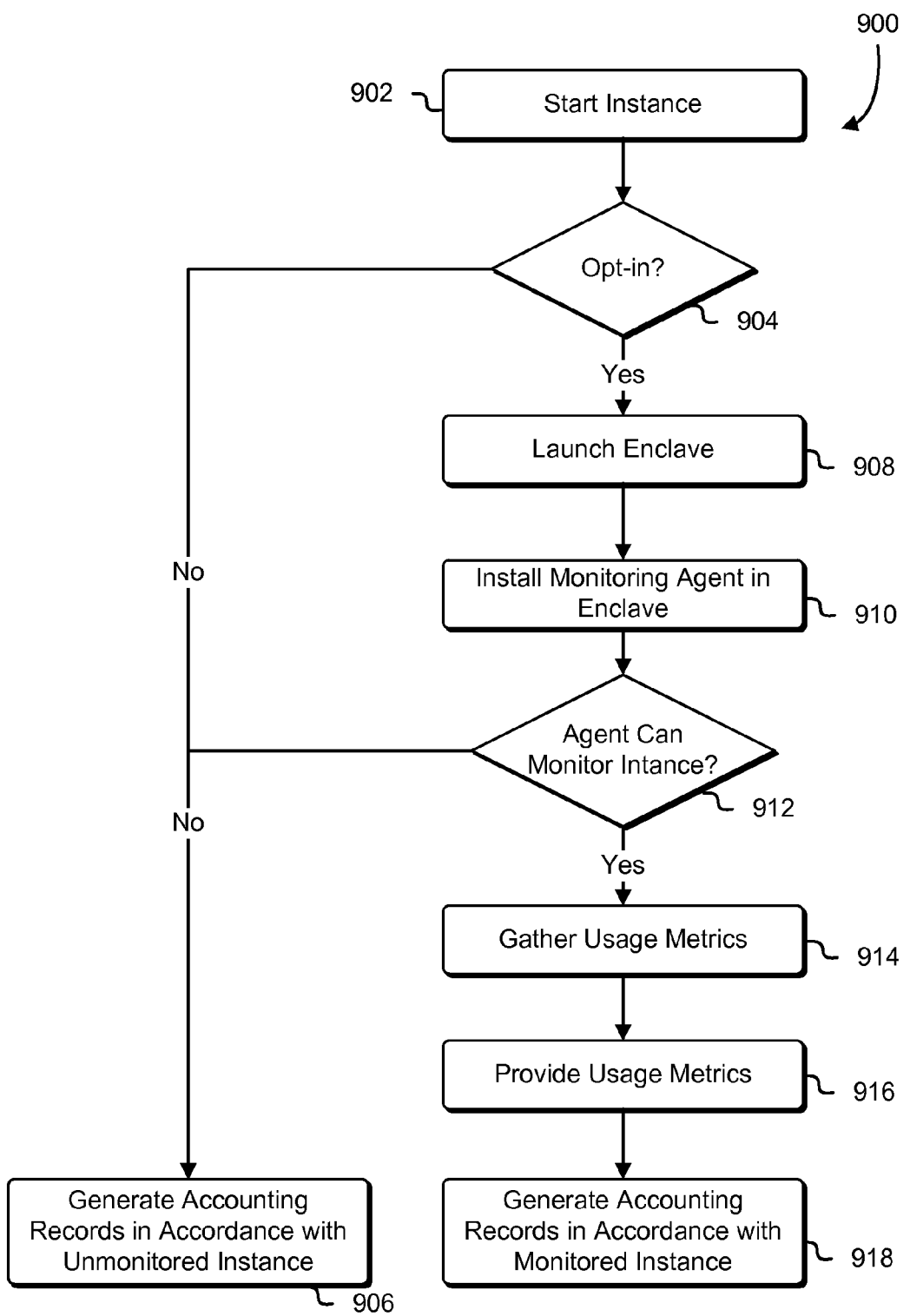
FIG. 9 is a flow chart that illustrates an example of an opt-in service using a monitoring agent in accordance with an embodiment.

FIG. 9 is a flow chart illustrating an example of a process 900 for a monitoring agent generating usage metrics in accordance with various embodiments. The process 900 may be performed by any suitable system such as a data server, application server or web server, such as the application server 1208 and web server 1206, or any electronic client device such as the electronic client device 1202 described in conjunction with FIG. 12. The process 900 includes a series of operations in which a monitoring agent is launched in an enclave for monitoring a customer instance and, depending on certain conditions, usage metrics may be gathered and customer billing records may be modified. In 902, a customer instance may be started. For example, the customer instance may be a virtual machine instance of a virtual computer system service of a computing resource service provider.

In 904, a determination may be made whether the customer has opted into allowing a monitoring agent to monitor the customer's instance. If the customer has not opted into allowing the monitoring agent to monitor the customer's instance, the system performing the process 900 proceeds to 906, in which the customer's billing records for the instance reflect a price structure in accordance with not opting into allowing the monitoring agent to monitor the customer's instance. Otherwise, if the customer has opted into allowing the monitoring agent to monitor the customer's instance, the system performing the process 900 proceeds to 908 where an enclave is instantiated for hosting the monitoring agent. As noted, the enclave and the monitoring agent within the enclave, in some embodiments, may share compute and memory resources with the customer instance, whereas in other embodiments the enclave and the monitoring agent within the enclave may be allocated compute and memory resources separate from the customer instance.

In 910, the monitoring agent may be installed within the enclave. The monitoring agent may be any application suitable for monitoring the customer's instance in accordance with the information-gathering purpose of the monitoring agent in this embodiment. In 912, the system performing the process 900 checks whether the monitoring agent is able to monitor the customer's instance, and, if not, the system performing the process 900 may proceed to 906. For example, if the customer has opted into allowing the monitoring agent to monitor the customer's instance, but subsequently interferes with the monitoring agent's ability to monitor the customer instance, the check at 912 may fail and the system performing the process 900 may proceed to 906.

In 914, the monitoring agent may monitor the customer instance and gather usage information about the usage of the instance. In some cases, the monitoring agent may additionally analyze and/or arrange the information. For example, the monitoring agent may gather information and determine that some of the gathered information is not relevant or reliable and discard the irrelevant or unreliable information. In 916, the monitoring agent may provide the usage metrics to a computing resource service provider of the virtual machine instance or to a third-party vendor, depending on the environment.

Finally, in 918, the system performing the process 900 may modify the billing records of the customer to reflect that the customer has opted into being monitored by the monitoring agent and that the monitoring agent is properly doing so. In some cases, the billing records may be modified to reflect a lower billing rate for the use of some or all resources associated with the customer virtual machine instance, in other cases the billing records may be modified to reflect a payment to the customer as a reward for opting into allowing the monitoring agent to monitor the customer instance.

Figure 10:
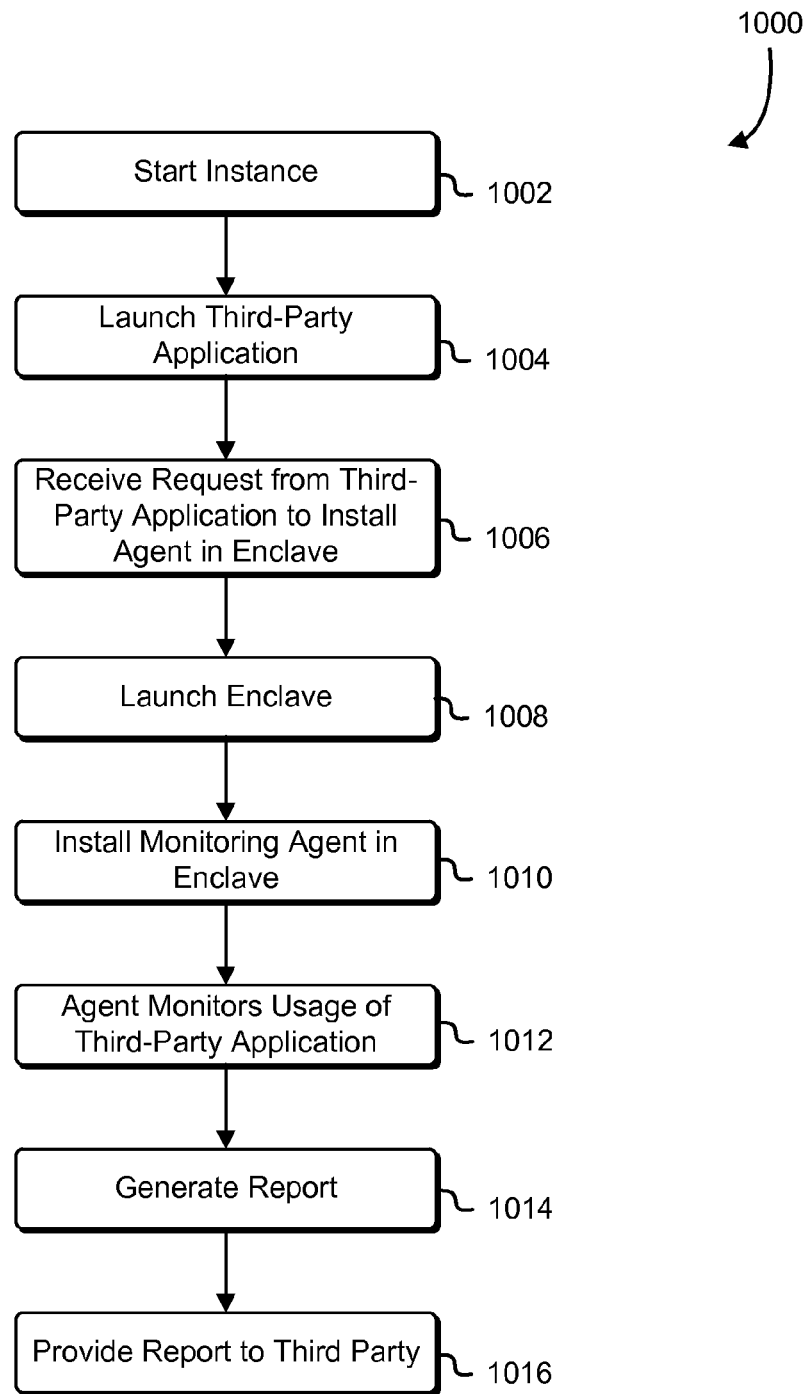
FIG. 10 is a block diagram that illustrates an example of third-party monitoring agents in accordance with an embodiment.

FIG. 10 is a flow chart illustrating an example of a process 1000 for a third-party monitoring agent for monitoring a third-party application in accordance with various embodiments. The process 1000 may be performed by any suitable system such as a data server, application server or web server, such as the application server 1208 and web server 1206, or any electronic client device such as the electronic client device 1202 described in conjunction with FIG. 12. The process 1000 includes a series of operations in which a third-party monitoring agent is installed in a customer instance at the behest of the third-party or the customer, and the third-party monitoring agent monitors the customer's use of a third-party software application. In 1002, a customer instance may be started. For example, the customer instance may be a virtual machine instance of a virtual computer system service of a computing resource service provider. The customer instance in this example may include installations of third-party software.

In 1004, the third-party software may be executed. In some cases, this may be the execution of an install program for the main third-party application, while in other cases it the operation at 1004 may refer to the main third-party application itself. The customer may have obtained the third-party software from a computing resource service provider or directly from the third-party entity. In 1006, the third-party software submits a request to instantiate an enclave and installs a third-party monitoring agent within the enclave. In some cases, this request may be submitted to the computing resource service provider, for example, through a particular application programming interface, whereas in other cases, the third-party software may cause an enclave to be created by making appropriate hardware or software instruction calls appropriate to generate an enclave, in accordance with the particular type of enclave supported on the host computer system of the customer instance.

In 1008, as a result of the request, an enclave may be instantiated on the host computer system, and in 1010, the third-party monitoring agent may be launched within the instantiated enclave. The third-party monitoring agent of the example process 1000 may include software designed by the third-party entity for monitoring and gathering information about aspects of the entity's third-party application, which the third-party monitoring agent may do in 1012. Aspects of the third-party application that may be gathered may include information collected about application faults and crashes, information about frequency of usage of the third-party application and information about the number of licenses of the third-party application.

In 1014, the third-party monitoring agent may prepare a report from the gathered usage information. The report may be a summary of the information gathered, a report organizing the information gathered, a report analyzing the information gathered, or may be a conversion of the gathered usage to for additional processing by another application. In 1016, the prepared report may be provided to the third-party or may be provided to the computing resource service provider. In some embodiments, information gathered and reflected by the report may result in the third-party providing the customer or the computing resource service provider with a disbursement for providing the information. In other embodiments, the third-party may provide the customer and/or the provider with an up-front or ongoing discount for the third-party's software in exchange for the provided reports.

FIG. 11 shows an example of a customer connected to a computing resource service provider in accordance with an embodiment. The computing resource service provider 1102 may provide a variety of services to the customer 1104 and the customer 1104 may communicate with the computing resource service provider 1102 via an interface 1126, which may be a web services interface or any other type of customer interface. While FIG. 11 shows one interface 1126 for the services of the computing resource service provider 1102, each service may have its own interface and, generally, subsets of the services may have corresponding interfaces in addition to or as an alternative to the interface 1126. The customer 1104 may be an organization that may utilize the services provided by the computing resource service provider 1102 to maintain and deliver information to its employees, which may be located in various geographical locations. Additionally, the customer 1104 may be an individual that utilizes the services of the computing resource service provider 1102 to deliver content to a working group located remotely. As shown in FIG. 11, the customer 1104 may communicate with the computing resource service provider 1102 through a network 1106, whereby the network 1106 may be a communication network, such as the Internet, an intranet or an Internet service provider (ISP) network. Some communications from the customer 1104 to the computing resource service provider 1102 may cause the computing resource service provider 1102 to operate in accordance with embodiments described.

The computing resource service provider 1102 may provide various computing resource services to its customers. The services provided by the computing resource service provider 1102, in this example, include a virtual computer system service 1108, a block-level data storage service 1110, a cryptography service 1112, an on-demand data storage service 1114, a notification service 1116, an authentication system 1118, a policy management service 1120, a task service 1122 and other services 1122. It is noted that not all embodiments described include the services 1108-1124 described with reference to FIG. 11 and additional services may be provided in addition to or as an alternative to services explicitly described. Each of the services 1108-1124 may include web service interfaces that enable the customer 1104 to submit appropriately configured API calls to the various services through web service requests. In addition, each of the services may include service interfaces that enable the services to access each other (e.g., to enable a virtual computer system of the virtual computer system service 1108 to store data in or retrieve data from the on-demand data storage service 1114 and/or to access block-level data storage devices provided by the block-level data storage service 1110).

The virtual computer system service 1108 may be a collection of computing resources configured to instantiate virtual machine instances on behalf of the customer 1104. The customer 1104 may interact with the virtual computer system service 1108 (via appropriately configured and authenticated API calls) to provision and operate virtual computer systems that are instantiated on physical computing devices hosted and operated by the computing resource service provider 1102. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 1108 is shown in FIG. 11, any other computer system or computer system service may be utilized in the computing resource service provider 1102, such as a computer system or computer system service that does not employ virtualization or instantiation and instead provisions computing resources on dedicated or shared computers/servers and/or other physical devices.

The block-level data storage service 1110 may comprise computing resources that collectively operate to store data for a customer 1104 using block-level storage devices (and/or virtualizations thereof). The block-level storage devices of the block-level data storage service 1110 may, for instance, be operationally attached to virtual computer systems provided by the virtual computer system service 1108 to serve as logical units (e.g., virtual drives) for the computer systems. A block-level storage device may enable the persistent storage of data used/generated by a corresponding virtual computer system where the virtual computer system service 1108 may only provide ephemeral data storage.

The computing resource service provider 1102 also includes a cryptography service 1112. The cryptography service 1112 may utilize storage services of the computing resource service provider 1102 to store keys of the customers in encrypted form, whereby the keys may be usable to decrypt customer keys accessible only to particular devices of the cryptography service 1112.

The computing resource service provider 1102 further includes an on-demand data storage service 1114. The on-demand data storage service 1114 may be a collection of computing resources configured to synchronously process requests to store and/or access data. The on-demand data storage service 1114 may operate using computing resources (e.g., databases) that enable the on-demand data storage service 1114 to locate and retrieve data quickly, so as to allow data to be provided in responses to requests for the data. For example, the on-demand data storage service 1114 may maintain stored data in a manner such that, when a request for a data object is retrieved, the data object can be provided (or streaming of the data object can be initiated) in a response to the request. As noted, data stored in the on-demand data storage service 1114 may be organized into data objects. The data objects may have arbitrary sizes except, perhaps, for certain constraints on size. Thus, the on-demand data storage service 1114 may store numerous data objects of varying sizes. The on-demand data storage service 1114 may operate as a key value store that associates data objects with identifiers of the data objects, which may be used by the customer 1104 to retrieve or perform other operations in connection with the data objects stored by the on-demand data storage service 1114.

In the environment illustrated in FIG. 11, a notification service 1116 is included. The notification service 1116 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1116 may provide notifications to clients using a "push" mechanism without the need to check or "poll" periodically for new information and updates. The notification service 1116 may further be used for various purposes such as monitoring applications executing in the virtual computer system service 1108, workflow systems, time-sensitive information updates, mobile applications, and many others.

As illustrated in FIG. 11, the computing resource service provider 1102, in various embodiments, includes an authentication system 1118 and a policy management service 1120. The authentication system 1118, in an embodiment, is a computer system (i.e., collection of computing resources) configured to perform operations involved in authentication of users of the customer. For instance, one of the services 1108-1116 and 1120-1124 may provide information from a user to the authentication system 1118 to receive information in return that indicates whether or not the user requests are authentic.

The policy management service 1120, in an embodiment, is a computer system configured to manage policies on behalf of customers (such as customer 1104) of the computing resource service provider 1102. The policy management service 1120 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 1102, in various embodiments, is also equipped with a task service 1122. The task service 1122 is configured to receive a task package from the customer 1104 and enable executing tasks as dictated by the task package. The task service 1122 may be configured to use any resource of the computing resource service provider 1102, such as instantiated virtual machines or virtual hosts, for executing the task. The task service 1120 may configure the instantiated virtual machines or virtual hosts to operate using a selected operating system and/or a selected execution application in accordance with a requirement of the customer 1104.

The computing resource service provider 1102 additionally maintains other services 1122 based on the needs of its customers 1104. For instance, the computing resource service provider 1102 may maintain a database service for its customers 1104. A database service may be a collection of computing resources that collectively operate to run databases for customers 1104. The customer 1104 may operate and manage a database from the database service by utilizing appropriately configured API calls. This, in turn, may allow a customer 1104 to maintain and potentially scale the operations in the database. Other services include object-level archival data storage services, services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 12:
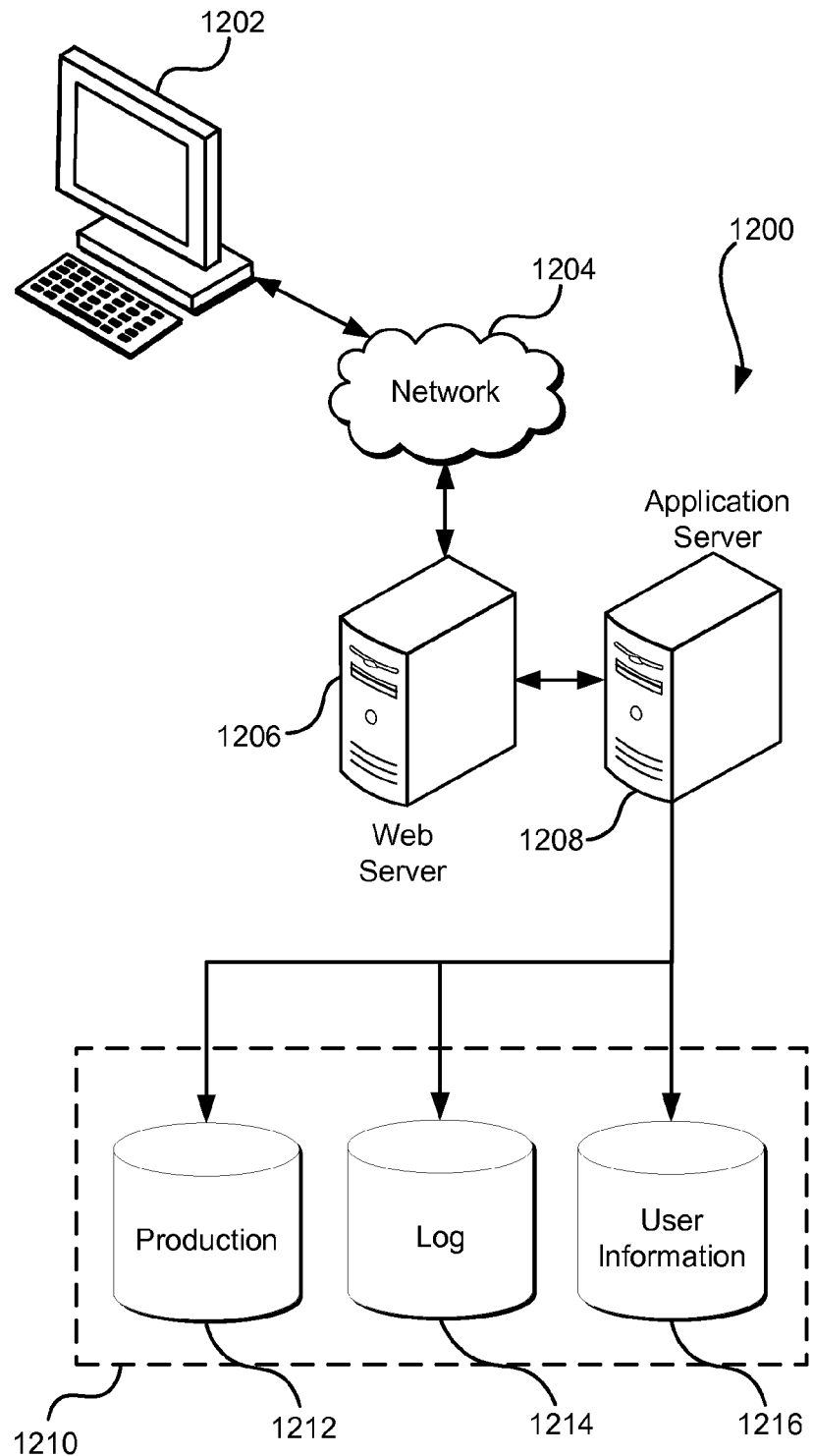
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, and a satellite network. Components used for such a system can depend in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there can be several application servers, layers or other elements, processes or components, which may be chained or otherwise configured, which can interact to perform tasks such as obtaining data from an appropriate data store.

Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of applications for the client device, handling some or all of the data access and business logic for an application. The application server may provide access control services in cooperation with the data store and is able to generate content including text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS") or another appropriate client-side structured language. Content transferred to a client device may be processed by the client device to provide the content in forms including forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, and structured code can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting and/or analysis. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications or news services, may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing web applications that may be implemented as scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad) and an output device (e.g., a display device, printer or speaker). Such a system may also include storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, computer programs or applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   for a computer system implemented using compute capacity of hardware of a service of a service provider, receiving, from a customer of the service provider, a request to monitor the computer system of a customer of the service provider; and
   using the compute capacity to launch a monitoring agent in an enclave on the hardware of the service provider, the enclave being a protected execution environment in memory address space of the computer system that provides confidentiality and integrity for applications and data in the memory address space, wherein the protected execution environment provides functionality for remote attestation as to a state of the protected execution environment, has a root of trust protected from being accessed outside the protected execution environment, and prevents unauthorized access to the monitoring agent, such that the monitoring agent is operable to:
   generate an assessment of a state of the computer system, and
   provide the assessment of the state of the computer system.

2. The computer-implemented method of claim 1, wherein the monitoring agent comprises executable instructions provided by the customer.

3. The computer-implemented method of claim 1, wherein the monitoring agent comprises executable instructions provided by the service provider.

4. The computer-implemented method of claim 1, further comprising determining, based at least in part on the assessment, whether to perform one or more operations, wherein the one or more operations comprise at least one of stopping the computer system, deprovisioning the computer system, denying or modifying network traffic sent to or from the computer system, modifying an allocation of resources of the computer system, and allowing or denying access to one or more devices.

5. The computer-implemented method of claim 1, wherein the computer system is a physical machine that supports enclave functionality.

6. The computer-implemented method of claim 1, further comprising updating an accounting system in accordance with the state of the monitored computer system.

7. The computer-implemented method of claim 6, further comprising:
   detecting, based at least in part on the assessment, an invalid state of compliance of the computer system; and
   updating the accounting system based at least in part on the invalid state.

8. The computer-implemented method of claim 1, wherein the monitoring agent is a type of anti-virus software, anomaly detection software, software that verifies that other software has been authorized for installation on the computer system, or software that verifies that software installed on the computer system is up-to-date.

9. One or more non-transitory computer-readable storage media having collectively stored thereon executable instructions that, upon execution by one or more processors of a first computer system, cause the first computer system to at least:
   receive a request whose fulfillment involves monitoring a second computer system hosted by a computing resource service provider for a customer of the computing resource service provider;
   launch a monitoring agent in an enclave on the first computer system of the computing resource service provider, the enclave being a protected execution environment in memory address space of the computer system that provides confidentiality and integrity for applications and data in the memory address space, wherein the protected execution environment provides functionality for remote attestation as to a state of the protected execution environment, has a root of trust protected from the customer, and prevents unauthorized access to the monitoring agent, such that the monitoring agent is configured to monitor the second computer system to produce an assessment of the second computer system; and
   based at least in part on the assessment, cause the computing resource service provider to perform one or more corresponding operations in connection with management of the second computer system.

10. The one or more non-transitory computer-readable storage media of claim 9, wherein the monitoring agent is obtained from a marketplace of the computing resource service provider and monitoring rules for the monitoring agent are defined by a third-party different from the customer and from the computing resource service provider.

11. The one or more non-transitory computer-readable storage media of claim 9, wherein:
the protected execution environment is an enclave; and
the instructions further comprise instructions that, when executed by the one or more processors, cause the first computer system to instantiate the enclave.

12. The one or more non-transitory computer-readable storage media of claim 9, wherein the monitoring agent is further configured to provide the assessment as a parameter of a hypercall to a hypervisor, wherein the assessment is digitally signed using a key stored within the protected execution environment.

13. The one or more non-transitory computer-readable storage media of claim 9, wherein the one or more corresponding operations comprise at least one of updating an accounting system associated with the second computer system, stopping the second computer system, and denying the second computer system access to a network.

14. The one or more non-transitory computer-readable storage media of claim 9, wherein the instructions further comprise instructions that, when executed by the one or more processors, cause the first computer system to provide the assessment to a third-party different from the customer and from the computing resource service provider.

15. The one or more non-transitory computer-readable storage media of claim 9, wherein the monitoring agent is provided by a third-party different from the customer and from the computing resource service provider.

16. The one or more non-transitory computer-readable storage media of claim 9, wherein the monitoring agent is further configured to transmit the assessment over a network to a computer system different than the second computer system.

17. The one or more non-transitory computer-readable storage media of claim 9, wherein the request is a web services request for launching a monitoring agent and a parameter of the web services request indicates that the monitoring agent should produce an assessment of the second computer system.

18. The one or more non-transitory computer-readable storage media of claim 9, wherein the assessment comprises a determination of compliance of the second computer system with one or more conditions set by the computing resource service provider.

19. A system, comprising, a set of computing devices that:
provide compute capacity as a service using hardware of a computing resource service provider;
execute instructions corresponding to a customer-specified software image;
receive a request whose fulfillment involves monitoring a computer system having a corresponding allocation of the compute capacity provided by the computing resource service provider;
use at least a portion of the compute capacity to instantiate an enclave on the hardware of the service provider, the enclave being a protected execution environment in memory address space of the computer system that provides confidentiality and integrity for applications and data in the memory address space; and
launch a monitoring agent in the protected execution environment, wherein the protected execution environment provides functionality for remote attestation as to a state of the protected execution environment, has a root of trust protected from being accessed outside the protected execution environment, and prevents unauthorized access to the monitoring agent, such that the monitoring agent is operable to:
generate an assessment of a state of the computer system, and
provide the assessment of the state of the computer system.

20. The system of claim 19, wherein the one or more services are further configured to:
determine, based at least in part on the assessment, whether to continue to allow the computer system to operate; and
stop operation of application code executing for the computer system in response to a determination to disallow the computer system from operating.

21. The system of claim 20, wherein the one or more services are further configured to determine, based at least in part on the assessment, whether to allow or deny access to one or more resources of the service provider based on a determination of whether the computer system is in a compliant state.

22. The system of claim 19, wherein the one or more services are further configured to use additional compute capacity offered as a service of the service provider to instantiate a virtual machine instance under the control of a control plane.

23. The system of claim 22, wherein the virtual machine instance is configured to:
request measurements from the monitoring agent; and
determine, based at least in part on the measurements, whether to provide data to the computer system.

24. The system of claim 19, wherein the one or more services are configured to allow or deny access to one or more resources of the computing resource service provider based on the assessment of the state of the computer system.

25. The system of claim 24, wherein the one or more resources include a network and the assessment includes information sufficient to determine whether the computer system is in a compliant state, such that allowing or denying access to one or more resources conditions access to the network upon the computer system being in the compliant state.

26. The system of claim 19, wherein the computer system is a virtual computer system to which a hypervisor allocates capacity of a hardware device and the monitoring agent utilizes the capacity of the hardware device allocated to the virtual computer system by the hypervisor.

* * * * *